(12) United States Patent
Miller et al.

(10) Patent No.: US 8,256,148 B2
(45) Date of Patent: *Sep. 4, 2012

(54) COUPLER

(75) Inventors: Gary Miller, Tyne & Wear (GB);
Ronald Keith Miller, Newcastle Upon Tyne (GB); Gary Pendleton, County Durham (GB); Howard Reay, Tyne & Wear (GB); Paul Grant, Tyne & Wear (GB)

(73) Assignee: Miller UK Limited, Cramlington, Northumberland (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/156,062

(22) Filed: Jun. 8, 2011

(65) Prior Publication Data
US 2011/0232070 A1 Sep. 29, 2011

Related U.S. Application Data

(63) Continuation of application No. 12/439,785, filed as application No. PCT/GB2007/003324 on Sep. 4, 2007, now Pat. No. 7,984,576.

(30) Foreign Application Priority Data

Sep. 4, 2006 (GB) ................................. 06173947.2
Jun. 13, 2007 (GB) ................................. 0711428.3

(51) Int. Cl.
*E02F 3/96* (2006.01)
(52) U.S. Cl. ....................................................... 37/468
(58) Field of Classification Search ................. 37/466, 37/468, 403–411, 231; 172/272, 273, 439, 172/450–456; 414/423, 723, 686; 403/31, 403/320–326, 315
See application file for complete search history.

(56) References Cited

U.S. PATENT DOCUMENTS

| | | | |
|---|---|---|---|
| 3,952,431 | A | 4/1976 | Gledhill et al. |
| 5,692,325 | A | 12/1997 | Kuzutani |
| 6,042,295 | A | 3/2000 | Barden |
| 6,132,131 | A | 10/2000 | Nakamura et al. |
| 6,308,442 | B1 | 10/2001 | Naka et al. |
| 2003/0175072 | A1 | 9/2003 | Steig et al. |
| 2004/0065190 | A1 | 4/2004 | Rice et al. |

(Continued)

FOREIGN PATENT DOCUMENTS

DE 20119092 U1 1/2002

(Continued)

OTHER PUBLICATIONS

International Search Report (ISR) and Written Opinion from priority application No. PCT/GB/003324.

(Continued)

*Primary Examiner* — Robert Pezzuto
(74) *Attorney, Agent, or Firm* — Stephen B. Salai; Brian B. Shaw; Harter Secrest & Emery LLP

(57) ABSTRACT

Couplers for attaching an accessory to an excavator arm of an excavator. Couplers having a first side for attaching the coupler to the excavator arm and a second side onto which the accessory will be coupled. The coupler includes a latch for selectively securing and releasing an attachment pin of the accessory in a jaw, groove, hook or slot in the second side of the coupler. The coupler is fully controllable from within the cab of the excavator and it allows improved security in the securement of the accessory to the coupler, i.e. preventing accidental decouplings, but while still allowing intentional decoupling operations to be carried out without undue burden.

20 Claims, 25 Drawing Sheets

U.S. PATENT DOCUMENTS

2005/0169703 A1      8/2005    Fatemi

FOREIGN PATENT DOCUMENTS

| | | |
|---|---|---|
| EP | 0405813 A | 1/1991 |
| EP | 0405811 A1 | 2/1991 |
| EP | 1318242 A2 | 11/2003 |
| EP | 1477615 A1 | 11/2004 |
| EP | 1637659 A2 | 3/2006 |
| GB | 617394 | 2/1949 |
| GB | 987078 | 3/1965 |
| GB | 1036498 | 7/1966 |
| GB | 1514489 | 6/1978 |
| GB | 2332417 A9 | 6/1996 |
| GB | 2330570 A | 4/1999 |
| GB | 2372979 B | 3/2001 |
| GB | 2359062 A | 8/2001 |
| GB | 2372979 A | 9/2002 |
| GB | 2424637 A | 10/2006 |
| GB | 2433246 A | 6/2007 |
| IE | 20060248 | 10/2006 |
| JP | 57079304 A | 5/1982 |
| JP | 7331690 A | 12/1995 |
| WO | 99/42670 A1 | 8/1999 |
| WO | 02066750 A1 | 8/2002 |
| WO | 2004/016863 A1 | 2/2004 |
| WO | 20040038110 A1 | 5/2004 |
| WO | 2005026454 A | 3/2005 |
| WO | 2008031590 A2 | 3/2008 |

OTHER PUBLICATIONS

UK Intellectual Property Office, Examination Report, dated Apr. 19, 2010, 3 pages.

US Department of Labor, Hazards of Inadequately Securing Hydraulic Excavator Buckets When Using Quick Coupling Devices, Safety and Health Information Bulletin, Dated Jul. 22, 2005, 4 pages.

Hazards of Inadequately Securing Hydraulic Excavator Buckets When Using Quick Coupling Devices, US Department of Labor, Safety and Health Information Bulletin, SHIB Jul. 22, 2005.

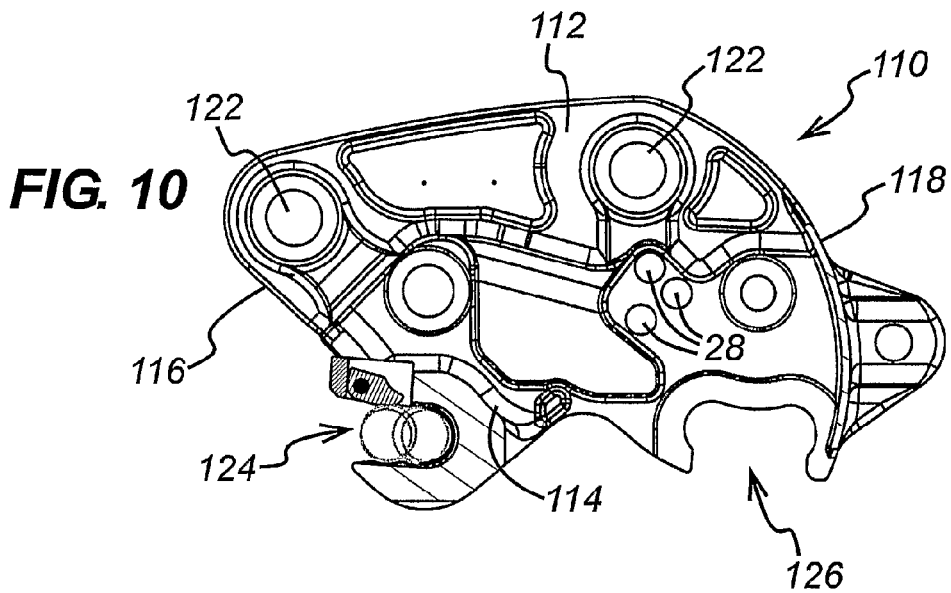
FIG. 10
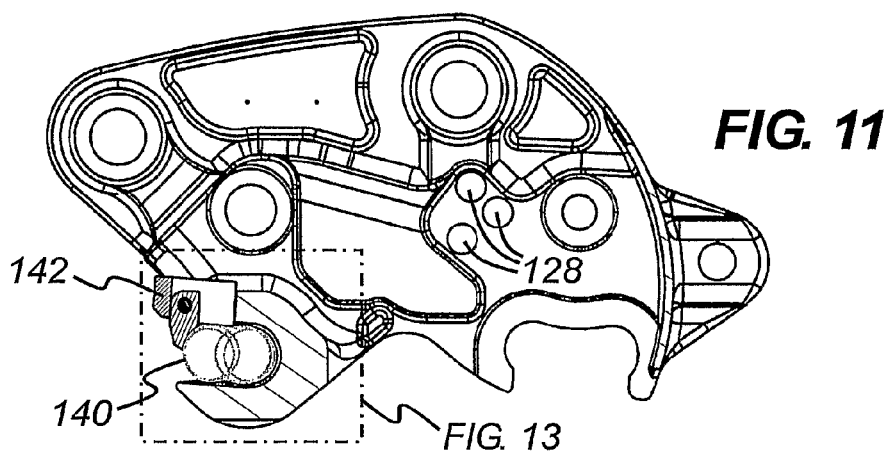
FIG. 11
FIG. 12
FIG. 13
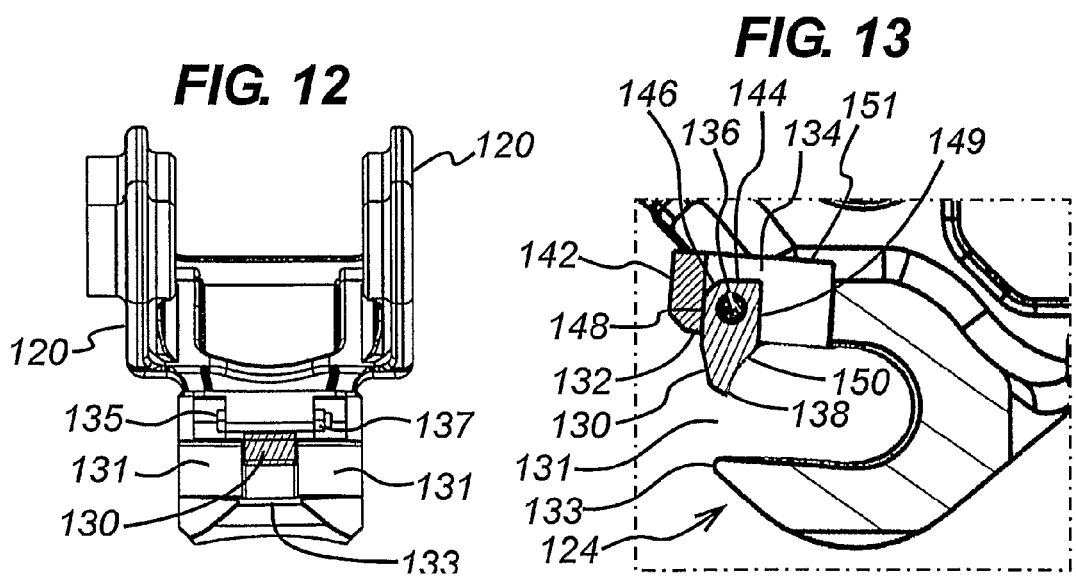

COUPLER

CROSS-REFERENCE TO RELATED APPLICATIONS

This application is a continuation of U.S. application Ser. No. 12/439,785 filed Mar. 3, 2009, as a National Stage 35 U.S.C. §371 filing of International Application No. PCT/GB2007/003324 filed on Sep. 4, 2007 claiming priority from both United Kingdom Patent Application Nos. GB0711428.3 filed Jun. 13, 2007 and GB0617394.2 filed Sep. 4, 2006. The entire contents of the predecessor applications are incorporated herein by reference.

BACKGROUND OF THE INVENTION

In brief, however, the present invention relates couplers for attaching an accessory, such as an excavator bucket, to an excavator arm of an excavator. Generally a coupler will comprise one or two jaws (or grooves, hooks or slots) and one or two latches for selectively securing (or releasing) one or two attachment pins of the accessory in the or each jaw (or groove, hook or slot).

BRIEF SUMMARY OF THE INVENTION

Many couplers have been developed in the art. Some are fully automatic, i.e. fully operable from within the cab of the excavator for both coupling and decoupling an accessory to or from the coupler and some are part automatic/part manual, requiring many or most operations for coupling and decoupling of an accessory to or from the coupler to be carried out from within the cab, but with one or more operations needing to be done instead at the coupler itself.

A part automatic and part manual coupler is disclosed in GB2359062. The coupler is attached remotely to the accessory, Le. from within the cab of the excavator. However, that attachment is made more secure by an additional manual step—the insertion of a safety pin into a position behind a pivoting latching hook of the coupler.

A fully automatic coupler is disclosed in GB2330570. It has a gravity operated blocking bar that is designed to fall behind the rear latching hook during normal use, whereby when the coupler is in use, and therefore in a normal, in-use or upright, orientation, the latching hook is prevented from being retracted by the presence of the blocking bar behind the latching hook. To release the accessory, however, that blocking bar is lifted from that blocking position either by a second hydraulic ram (Le. one that is not connected to the latching hook) or simply by inverting the coupler, Le. by moving the excavator arm and coupler into either the crowd position or to a position curled above the excavator arm (an unconventional position for an excavator arm to assume). In that inverted orientation, the blocking bar will fall away from its blocking position to allow the latching hook for the rear attachment pin then to be retracted by the latching hook's own hydraulic ram.

There are also many other couplers, either fully automatic or part automatic and part manual. See, for example, the couplers disclosed in the following publications: Australian Patent AU557890, German Utility Model DE20119092U, European Patent Applications EP0405811 and EP1318242, GB Patent Application GB2332417, U.S. Pat. No. 5,692,325 and U.S. Pat. No. 6,132,131, and PCT Publication WO99/42670.

The majority of prior art couplers have a first (or top) half that is for attaching the coupler to the excavator, and that attachment is generally to an excavator arm of the excavator. The coupler of EP0405813, however, is instead for attaching a digger bucket to the front end loader of the excavator. The couplers then have on the other or opposite side of the coupler two attachment pin engaging jaws, grooves, hooks or slots, whereby an accessory having a pair of attachment pins (such as an excavator bucket) can be attached to that coupler via the pair of attachment pins: one of the jaws, grooves, hooks or slots is for engaging a first or front attachment pin of the accessory and the other jaw, groove, hook or slot is for engaging the second or rear attachment pin of the accessory.

Couplers are also known for attaching accessories that have only one attachment pin. Those couplers have just one jaw, groove, hook or slot. Typically, however, the accessory then has the other jaw, groove, hook or slot for engaging a second attachment pin, which is instead positioned on the coupler.

Despite the existence of numerous designs of coupler, there is still an ever increasing demand upon the industry for the provision of even more security for fully automatic couplers, and for which couplers no manual steps need to be carried out by the user on the coupler for completing the securement or detachment of an accessory. A purpose for this drive is that it allows the user to remain within the safe environment of the cab of the excavator. This is important since accessories and couplers are typically quite large and heavy pieces of equipment, and thus they are potentially dangerous when being manipulated by an excavator.

For couplers having a pair of jaws, one of the jaws usually faces downwards, i.e. away from the first half of the coupler, and that jaw is usually referred to as the rear jaw—it is normally located, in use, the furthest away from the cab, and excavator arms usually extend from a rear of the excavator. Due to its position, and the way it faces in use, often that jaw is not visible from the cab. The other jaw, however, usually faces away from that rear jaw and towards the cab. It generally is also rotated by approximately 90° relative to the rear jaw, i.e. instead of pointing downwards, it usually points forwards. It is usually, in use, nearer to the cab than the rear jaw and thus it is usually referred to as the front jaw.

In many such prior art couplers a pivoting or sliding latching hook or latching plate is provided for the rear jaw for locking an attachment pin within that jaw. Thus, to couple the accessory to the coupler, a first or front attachment pin is first engaged into an open front jaw of the coupler, and the coupler is then rotated or manipulated relative to the accessory to position the second attachment pin into the coupler's open rear jaw. Then the latching hook or latching plate is driven rearwardly, for example by a hydraulic piston or a screwthread, to close the rear jaw to lock the rear attachment pin within the rear jaw. That in turn locks the front attachment pin in the front jaw.

Such a securement of the accessory to the coupler is entirely secure, subject to there being no failure of the respective components of the coupler. However, users of such couplers additionally demand back-up safety mechanisms to be incorporated into those couplers to provide assurances that an accessory cannot accidentally be decoupled from a coupler, even if the drive mechanism for the latching hook or the latching plate is accidentally retracted or in the event of a misuse of the coupler, or even in the event of a failure of a component of the coupler or the accessory. Further, there is a drive towards making the back-up safety features both automatic to implement and visible from within the cab. By being automatic, they cannot be omitted or forgotten by the user, and by being visible from the cab it is possible to assess their status from the cab, i.e. to carry out a remote visual check as to whether the safety features have adopted their correct backup safety position for ensuring a backed-up securement between the coupler and the accessory. Further, the demand is for such couplers that still allow fully automatic coupling and decoupling of the accessory from the coupler.

It should also be observed that many prior art couplers have the provision for accommodating different accessories, i.e. ones having different distances between their respective attachment pins. That allows accessories from different manufacturers, or from different product ranges, to be accommodated by the coupler (it is commonplace for different buckets and other accessories from different manufacturers to have different distances between their pairs of attachment pins, i.e. different pin spacings). Prior art couplers generally achieve that by the provision of either a screwthread drive system or a hydraulic ram mounted between the two jaws, grooves, hooks or slots. The screwthread or a hydraulic ram can then move one or both of the jaws, grooves, hooks or slots relative to a frame of the coupler to accommodate the different pin spacings. Generally speaking, however, just one of the jaws, grooves, hooks or slots is moved by the screwthread or hydraulic ram, and that one is most frequently the rear one (or the latch associated therewith).

The securement of the two attachment pins within the two jaws is generally by a relative separation of the two pin-engaging components. That securement of the two fixed attachment pins of the accessory within the two jaws of the coupler can be referred to as a primary securement since it alone provides a securement of the accessory to the coupler. Such primary securement mechanisms are strong and thus are generally reliable since it is most unlikely that a component of it, such as either the screwthread or the hydraulic ram, or the hook or jaw themselves, will fail. That is because these items are all designed to meet the demands of the usual environment of use for the coupler. Indeed, these items are often "over-engineered" to provide a significant overload buffer). Despite that, however, it is usual to provide the above mentioned back-up safety (or failsafe) mechanisms to prevent the accessory from decoupling from the coupler in the unlikely event of such a failure.

Such safety back-up mechanisms, as known in the art, include at a most simple level, just a cover for the actuation circuit (usually in the cab of the excavator). That prevents accidental access to the actuation switches during use of the accessory. However, there is a demand for additional security. As such, failsafe mechanisms are provided in or on the coupler itself. See, for example, the coupler of EP1318242. It has a spring driven hook for the front jaw, which hook defaults to a closed state for securing a front attachment pin within the front jaw of the coupler. Therefore, even if the rear hook fails, the accessory is secured within the coupler. A problem with that coupler, however, is that if the decoupling command is given accidentally, the spring driven hook will automatically be retracted by the hydraulic ram as the sliding rear jaw reaches a fully retracted position. U.S. Pat. No. 6,132,131 and U.S. Pat. No. 5,692,325 similarly provide a latching hook for the front jaw that is driven by the rear jaw's hydraulic ram, and as such they also have that same problem. In GB2332417, however, a toggling dual-hook arrangement is provided—there are two moving hooks that are interconnected by a toggling arrangement to ensure that as one hook opens the other hook closes, and vice versa. This prevents both hooks from opening simultaneously. However, if either the link or one of the hooks fails, the coupling between the accessory and the coupler becomes vulnerable.

The present invention, therefore, seeks to provide coupler designs that are both fully controllable from within the cab, and that will allow improved security in the securement of the accessory to the coupler, i.e. preventing accidental decouplings, but while still allowing intentional decoupling operations to be carried out without undue burden.

According to a first aspect of the present invention there is provided a coupler for coupling an accessory to an excavator arm of an excavator, the coupler comprising a first portion for attaching the coupler to an excavator arm of an excavator and the coupler having a second portion adapted to receive an accessory with two attachment pins, wherein:

the second portion has two jaws, one for receiving a first attachment pin of an accessory and the other for receiving a second attachment pin of the accessory;

a first latch is associated with the first jaw for securing the first attachment pin within the first jaw when the first latch is in a latching position;

a second latch is associated with the second jaw for securing the second attachment pin within the second jaw when the second latch is in a latching position;

a third latch is provided that extends between the first and second latches, the third latch, when in a latching position, being adapted to resist movement of the first latch from a latching position into a non-latching position; and when the third latch is in a non-latching position, the first latch is not resisted from moving between a latching position and a non-latching position by the third latch.

Preferably the second latch is linked or connected to the third latch.

Preferably the second latch is pivotally linked to the third latch. They may, however, be an integrally formed member.

In another arrangement, the second and third latches are separate components that are selectively engageable with each other by movements of one or both of those latches, and wherein the third latch also resists movement of the second latch from a latching position into a non-latching position when it is itself in a latching position but wherein it will not resist movement of the second latch from a latching position into a non-latching position when it is in some other predetermined position. Preferably that predetermined position cannot be assumed by the third latch while a first attachment pin is secured within the first jaw by the first latch. Preferably that is achieved by the provision of a flange on the first latch that restricts movement of the third latch while a first attachment pin is secured within the first jaw by the first latch.

Preferably the latching position of the third latch is its default position, i.e. the position it assumes during normal use of the coupler (i.e. non-inverted and with an attachment attached thereto).

Preferably the third latch is moveable from a latching position into a non-latching position by means of gravity by at least partially inverting the coupler. Alternatively, or additionally, a mechanical actuator may be provided for moving the third latch.

A biasing member may be provided to bias the third latch towards a latching position.

Preferably the third latch, in a latching position bears against the first latch.

One or more of the latches may comprise a solid bar and/or a hook.

One or more of the latches may comprise a pair of solid bars and/or hooks.

One or more of the latches may comprise a bifurcated bar or hook.

Preferably the first latch is moveable from a latching position into a non-latching position by a mechanical actuator, such as a hydraulic ram.

Preferably the second latch is moveable from a latching position for the second jaw into a non-latching position for the second jaw by means of gravity by at least partially inverting the coupler. Alternatively, or additionally, a mechanical actuator may be provided for moving the second latch.

A biasing member may be provided to bias the second latch towards a latching position.

The same biasing member and/or mechanical actuator may control the movements of both the second latch and the third latch since those latches are linked or connected together.

Preferably the second jaw has a recessed groove in its lower half.

Preferably the coupler can accommodate a range of pin spacings between the two attachment pins of the accessory by making the rear jaw significantly wider in side view than the front jaw (or wider than the diameter of a typical rear attachment pin for that size of coupler). In this manner, accessories from different manufacturers, with different pin spacings, can be attached to the coupler without modification of either the coupler or the accessory.

For adjusting the first latch, the mechanical actuator is preferably a hydraulic ram. It might, however, be a pneumatic ram or a screwthread drive mechanism.

Preferably the mechanical actuator is mounted within the confines of the coupler, generally between and slightly above the two jaws.

Preferably the first latch is a pivoting latching hook, or a pair of pivoting latching hooks.

Preferably the first latch pivots to move through an arc between a latching position and a non-latching position. In other embodiments it might be a plate that slides such that it moves linearly between a latching position and a non latching position.

Each jaw may be bifurcated. It is preferred, however, that the first jaw is a pair of jaws formed in the two sidewalls of the coupler. It is also preferred that the second jaw is a single piece jaw, for example a moulded jaw or a welded multi-part fabrication.

It should be noted that the term "jaw" should be interpreted to encompass similar attachment pin receiving members such as grooves, hooks or slots, or other similar terms that are to be found in the art. For example, a hook, a groove or a slot in the main body of a coupler can form a jaw.

Preferably the first latch has a latching face facing in a first direction for bearing against the first attachment pin and a second face facing away from that latching face. Preferably one or more flange is formed on that second face. Then, in its latching position, the third latch preferably rests on one or more of those flanges. Preferably the predetermined position lies beyond the position that the third latch assumes when resting upon that flange.

The end of the third latch adapted to rest on those flanges may have one or more stepped surfaces. It would be one or more of those stepped surfaces that would preferably rest on that or those flange(s).

The first latch is adapted to be moveable into a non-latching position from a latching position by retracting it generally in the direction that its second face faces. However, when a pin is not within the first jaw, the first latch is also able to move in the opposite direction beyond the position in which its latching face would have engaged an attachment pin had one been in the first jaw. By that additional range of motion, the flange or flanges on the first latch can be moved clear of the reach of the third latch. As a result the range of available motion for the third latch is also extended. That enables the third latch to be extended into the predetermined position, if desired.

The present invention also provides a method of attaching an accessory to a coupler on an excavator arm of an excavator, the method comprising:

a) providing an excavator with a powered excavator arm having a coupler on an end thereof, the coupler comprising two jaws and a latch for each jaw, one of the latches being powered for movement between a latching position and a non-latching position, and the other being moveable from a latching position into a non-latching position by fully extending the powered latch beyond a latching position, i.e. while there is no pin within that jaw, into a fully extended position while the coupler is in a normal, in use, orientation;

b) providing an accessory with two accessory pins thereon sized and spaced to fit into the two jaws of the coupler;

c) powering the powered latch to extend it into the fully extended position to move the other latch into a non-latching position;

d) manipulating the coupler to locate a first attachment pin of the accessory into the jaw associated with that other latch;

e) curling the accessory and coupler, using the excavator arm, so as to invert the coupler, thereby placing the accessory roughly above the coupler;

f) reverse powering the powered latch to retract the powered latch for opening its associated jaw, whereupon the second attachment pin locates into that jaw under the weight of the accessory;

g) powering the powered latch to extend it to a latching position for securing the second attachment pin in its jaw; and h) uncurling the coupler, using the excavator arm. The attachment is now attached securely to the coupler.

In an alternative arrangement, the present invention provides a method of attaching an accessory to a coupler on an excavator arm of an excavator, the method comprising:

a) providing an excavator with a powered excavator arm having a coupler on an end thereof, the coupler comprising two jaws and a latch for each jaw, each latch being selectively moveable between a latching position and a non-latching position, wherein one of the latches is powered for movement between a latching position and a non-latching position, and the other is selectively resisted from movement from a latching position into a non-latching position by a third latch, wherein that third latch can be moved into a predetermined, non-latch-resisting position upon extending the powered latch beyond a latching position, i.e. while there is no pin within that jaw, into a fully extended position while the coupler is in a normal, in use, orientation, b) providing an accessory with two accessory pins thereon sized and spaced to fit into the two jaws of the coupler;

c) powering the powered latch to extend it into the fully extended position for moving the third latch into its predetermined, non-latch-resisting position;

d) manipulating the coupler to locate a first attachment pin of the accessory into the jaw associated with the other latch;

e) curling the accessory and coupler, using the excavator arm, so as to invert the coupler, thereby placing the accessory roughly above the coupler;

f) reverse powering the powered latch to retract the powered latch for opening its associated jaw, whereupon the second attachment pin locates into that jaw under the weight of the accessory;

g) powering the powered latch to extend it to a latching position for securing the second attachment pin in its jaw; and h) uncurling the coupler, using the excavator arm. The attachment is now attached securely to the coupler.

The present invention also provides a method of detaching an accessory from a coupler on an excavator arm of an excavator, the method comprising:

a) providing an excavator with a powered excavator arm having a coupler on an end thereof and with an accessory coupled thereto, the accessory having two accessory pins thereon located within two jaws of the coupler, and secured into those jaws by respective latches associated with each jaw, wherein one of the latches is powered for movement between a latching position and a non-latching position, and the other latch is moveable from a latching position into a non-latching position, when an attachment pin is not located within the other jaw, by fully extending the powered latch beyond a latching position into a fully extended position while the coupler is in a normal, in use, orientation;

b) curling the accessory and coupler, using the excavator arm, so as to invert the coupler, thereby placing the accessory roughly above the coupler;

c) reverse powering the powered latch to retract the latch for opening its associated jaw;

d) uncurling the coupler and attachment, using the excavator arm, to position the accessory below the coupler whereupon the attachment pin within the opened jaw exits the opened jaw under the weight of the accessory;

e) powering the powered latch to extend it into the fully extended position to move the other latch into a non-latching position to open the other jaw; and f) manipulating the coupler relative to the attachment to remove the other attachment pin of the accessory from that other jaw.

Preferably the act of inverting the coupler and accessory to place the accessory roughly above the coupler serves to move a mechanical stop away from a latching position behind the powered latch.

Preferably the mechanical stop is linked to the other latch.

Preferably the movement of that powered latch into the fully extended position allows the mechanical stop to move beyond its own latching position into a final release position, or the above mentioned predetermined position, whereupon the other latch is released to be free to move into a non-latching position.

In an alternative arrangement, the present invention provides a method of detaching an accessory from a coupler on an excavator arm of an excavator, the method comprising:

a) providing an excavator with a powered excavator arm having a coupler on an end thereof and with an accessory coupled thereto, the accessory having two accessory pins thereon located within two jaws of the coupler, and secured into those jaws by respective latches associated with each jaw, each latch being selectively moveable between a latching position and a non-latching position, wherein one of the latches is powered for movement between a latching position and a non-latching position, and the other latch is selectively resisted from movement from a latching position into a non-latching position by a third latch, wherein that third latch can be moved into a predetermined, non-latch-resisting position upon extending the powered latch beyond a latching position, i.e. while there is no pin within that jaw, into a fully extended position while the coupler is in a normal, in use, orientation;

b) curling the accessory and coupler, using the excavator arm, so as to invert the coupler, thereby placing the accessory roughly above the coupler;

c) reverse powering the powered latch to retract the latch for opening its associated jaw;

d) uncurling the coupler and attachment, using the excavator arm, to position the accessory below the coupler whereupon the attachment pin within the opened jaw exits the opened jaw under the weight of the accessory;

e) powering the powered latch to extend it into the fully extended position to move the third latch into its predetermined, non-latch-resisting position;

f) moving the other latch into a non-latching position; and g) manipulating the coupler relative to the attachment to remove the other attachment pin of the accessory from that other jaw.

Preferably step f) is achieved by recurling the accessory and coupler, using the excavator arm, so as partially to invert the coupler, thereby placing the accessory in a position that is substantially level with the coupler. That then allows the other latch to fall into a non-latching position under the influence of gravity if it is free to do so. It should be appreciated, however, that that other latch might instead be power operated, e.g. it may have its own actuator, such as a hydraulic ram.

It would also be desirable to provide just a simple supplementary failsafe or securement mechanism for couplers. Preferably the supplementary failsafe or securement mechanism will be able to ensure that an accessory will still be retained upon the coupler until that supplementary failsafe or securement mechanism is released even in the event of a catastrophic failure of the primary securement mechanism, e.g. the hydraulic ram or the screwthread, or even a moveable jaw, groove, hook or slot, or even in the event of an accidental or inadvertent release of that primary securement mechanism by the operator.

According to a further aspect of the present invention, therefore, there is provided a coupler for coupling an accessory to an excavator arm of an excavator, the accessory comprising at least one attachment pin for use in the coupling, the coupler comprising a first side for attaching the coupler to an excavator arm of an excavator and the coupler having a second side onto which the accessory will be coupled, the second side comprising a jaw for receiving the attachment pin of the accessory for connecting the accessory to the coupler by the engagement of the jaw with the attachment pin, wherein the jaw comprises a gravity-operated member having a first state—the jaw-open or jaw-unlocked state, and a second state—the jaw-closed or jaw-locked state, the gravity-operated member at least partially closing the jaw of the coupler when it is in its first state, said first state being achieved by the gravity-operated member when the coupler (and, when connected, the accessory) is in a normal, in-use orientation due to the influence of gravity on the gravity-operated member.

Preferably the two different states of the gravity-operated member are two different positions of the gravity-operated member. However, the gravity-operated member might instead simply remain in a constant normal position, instead switching between a rotatable or free state and a non-rotatable or more restricted state depending upon the orientation of the coupler.

The present invention, with its gravity-operated member, therefore has a jaw that can be selectively opened or closed (or unlocked and locked) dependent upon the orientation of the coupler since gravity will open or unlock the member in one orientation and will close or lock the member (with the jaw at least partially closed by the member) in other orientations.

It should be noted that the terms "jaw" should be interpreted to encompass similar pin receiving members such as grooves, hooks or slots, or other similar terms that are to be found in the art. For example, a hook can form a jaw, a groove or a slot, and similarly a groove is in essence just a slot. In view of that, and also for the sake of convenience, the single term "jaw" is used hereinafter.

Preferably, in a first orientation (e.g. the normal, in-use orientation) the member will fall under the influence of gravity into its closed position. However, upon reorienting the coupler, for example to an inverted position, the member will fall under the influence of gravity from that closed position into its open position. Instead of simply falling between two positions, however, the member may roll, slide or pivot between those positions. Alternatively, it might remain stationary, instead either being locked or unlocked from a particular closed position dependent upon the orientation (or path of motion between orientations) of the coupler.

When open (or unlocked), an attachment pin within the jaw, when not otherwise restrained, can be removed from the jaw. Similarly, an attachment pin can be inserted into the jaw. However, when closed, be that either completely or partially, or when locked, an attachment pin within the jaw cannot be removed from the jaw since the locked or closed member will block its path out of the jaw. It might be possible, however, dependent upon the chosen configuration of the locking/closing mechanism, to insert an attachment pin into the jaw even when the gravity-operated member is either closing the jaw or locking the jaw closed, e.g. by sliding it sideways into the jaw, rather than from the front of the jaw.

Preferably, the gravity-operated member is mounted onto the second side of the coupler either directly to the jaw, or onto a frame of the coupler, which frame carries the jaw.

Preferably the gravity-operated member is a pivotal member, mounted to the coupler about a pivot axis, the pivoting of the member moving it between its open and closed (or locked and unlocked) positions.

Preferably the first side is a top side of the coupler, the second side is a bottom side of the coupler, and the coupler also comprises a frame having two sideplates extending generally between the top and bottom sides of the coupler. Preferably the pivot axis runs perpendicular to those sideplates, i.e. in a transverse direction of the coupler. The axis might, however, extend in a longitudinal direction of the coupler (the above-mentioned pin-spacing is measured in the longitudinal direction of the coupler, whereas the attachment pins of an accessory extend in the transverse direction of the coupler).

The gravity operated member might comprise two pivoting axes, the first running in the transverse direction of the coupler and the second running in the longitudinal direction of the coupler. This allows the member to pivot in more than one direction. Even more pivoting directions can be achieved with a ball and socket joint.

Instead of pivoting, the member may slide or roll between its open and closed/locked and unlocked positions.

Preferably an accessory for coupling to the coupler comprises two attachment pins, the coupler thereby needing two jaws. One or more gravity-operated member as defined above may be provided for each or either jaw. However, preferably only one jaw has a gravity-operated member for closing the jaw, and most preferably it will just be the front jaw—usually the jaw without a hydraulically or mechanically driven latching hook or latching plate.

Preferably the other jaw (the rear jaw) points downwards and has a hydraulically or mechanically driven latching hook or latching plate, which, together with the first jaw, (which usually points forwards) provides a primary coupling mechanism for coupling the accessory to the coupler in a fixed orientation relative to the coupler. The gravity-operated member is then preferably a secondary securing mechanism (as a secondary securing mechanism, the gravity-operated member does not serve to couple the accessory to the coupler in a fixed orientation relative to the coupler, but instead merely serves to attach or tether the accessory to the coupler simply by retaining the attachment pin within the first jaw when the member is in its closed or locked position).

The coupler with two jaws may be in accordance with any of the other aspects of the invention described above.

Preferably, the gravity-operated member is not hook-shaped. The member instead is preferably a blocking bar, a blocking toggle or a blocking wedge.

By the term "gravity-operated", it is intended that no spring or hydraulic member, or any other mechanical, hydraulic, magnetic or electrical biasing influence, is to be used, in normal use, to move the member from its closed or locked position into its open or unlocked position. Instead, simply gravity is to be relied upon for that purpose, whereby the coupler has to be at least partially inverted in order to release the gravity-operated member. Such an inversion of the coupler, sufficient for decoupling the accessory from the coupler, should not occur during the normal use of the coupler with an accessory attached thereto since it is unusual to operate an excavator arm and accessory in a manner that places the accessory suitably above the end of the excavator arm.

Similarly it is desired just to rely upon gravity to return the member to its closed or locked position. However, it is possible to provide a gravity-operated member that has a biasing member, such a spring, for assisting in ensuring that the gravity-operated member will fall, move into or assume its closed or locked state when the coupler is in its normal, in-use orientation. In such an embodiment, gravity would still be relied upon to overcome that biasing force in order for the member to assume its open or unlocked state.

Preferably, when the coupler comprises two jaws, the second or rear jaw is associated with a moveable latch and a mechanical stop for selectively locating behind that moveable latch for selectively restricting the movement of that moveable latch.

Preferably the mechanical stop is also operable under the influence of gravity.

Preferably, when the coupler is in a normal, in use, level orientation, i.e. with the two jaws approximately level with each other, with an accessory arranged below the coupler, and with an attachment pin of the accessory retained within the second jaw by the moveable latch, the mechanical stop tends, under the influence of gravity, to fall into a position resting against the moveable latch for restricting the movement of that moveable latch from that pin latching position.

Preferably, when the coupler is in an inverted position, the mechanical stop instead falls away from the moveable latch, into a non-latching position. That position allows the second latch to be retracted from its latching position for releasing the pin retained by it within the second jaw.

Preferably the mechanical stop, when it is resting against the moveable latch provided for the rear jaw, also provides a movement-restricting function for the gravity operated member, whereby the gravity operated member cannot be moved into a jaw-open position.

Preferably the mechanical stop, when the coupler is inverted, also provides against the gravity operated member a bias towards a front-jaw-closing position for that gravity operated member.

Preferably the mechanical stop has a third position that is only achievable by the mechanical stop while an attachment pin is not retained within the second jaw. Preferably that position is a position beyond the position assumed by the mechanical stop as it rests against the moveable latch for the rear jaw. Preferably that third position disengages the movement-restricting function of the mechanical stop in relation to the gravity operated member. Thus, while an attachment pin is secured within the rear jaw by the moveable latch associated therewith, the front jaw cannot be opened by movement of the gravity operated member. However, upon disengagement of the attachment pin from the rear jaw, the third position for the mechanical stop can be achieved, and thus the front jaw can also be opened.

Preferably the mechanical stop has a pivot axis and a first arm pointing from that pivot axis generally towards the gravity operated member for the front jaw, and a second arm pointing from that pivot axis generally towards the moveable latch for the rear jaw.

Preferably the two arms extend away from each other at an angle of greater than 90° (and less than 270°).

Preferably the arm that points generally towards the gravity operated member has a flange on it that is adapted to bear against a corresponding flange of the gravity operated member. The interaction between those flanges restrict the motion of the gravity operated member. Thus, when the mechanical stop is in its third position, the two flanges are separated with respect to each other such that they cannot bear against each other through the range of motion required by the gravity operated member for opening the front jaw.

Preferably the two flanges have opposing angled faces that bear against each other when the coupler is inverted for biasing the gravity operated member into or towards a locked or closed position.

For a pivoting mechanical stop that operates under the influence of gravity, the moment of inertia for the mechanical stop needs to be such that arm of the blocking bar extending towards the moveable latch for the rear jaw will tend to overbalance the other arm. For example, the arm of the blocking bar extending towards the moveable latch will tend to be significantly heavier or longer than the other arm.

Preferably the gravity operated member has a stop-surface adapted to bear against a corresponding surface of the coupler's frame when the gravity operated member is in a front-jaw-locking or closing position for preventing movement of the gravity operated member beyond that front-jaw-locking or closing position. Two such stop surfaces that are spaced apart may be provided to spread the loading across a larger area of the frame in the event of the accessory's weight being carried by that gravity operated member, e.g. if the accessory is incorrectly mounted onto the coupler.

Preferably the two stop surfaces are planar. More preferably they are not co-planar.

Preferably one of the stop surfaces is a forward facing surface, with the corresponding surface of the coupler's frame lying as a rearward facing surface of the frame, for example on a forwardly extending integral rail of the frame.

Preferably the second stop surface is provided on an underside of a third flange of the gravity operated member.

Preferably, the gravity-operated member is arranged such that it will be in its locked or closed state for most normal, in-use orientations and rotations of the coupler. Those normal, in-use orientations will usually range from a level orientation (i.e. where the two attachment pins are level) to perhaps at least 45° from that level orientation in a first or digging curl direction (i.e. moving towards the crowd position) and from the level orientation to perhaps at least 135° from that level orientation in an opposite curl direction—the emptying curl direction (i.e. up and over the excavator arm). Therefore the preferred embodiment of the present invention will keep its gravity-operated member in a locked or closed position through a range of angles of curl perhaps in excess of 180°.

In a more preferred embodiment, the member will only move to its open position in response to specific re-orientations of the coupler, such as a full inversion of the coupler (i.e. into a position curled up and above the excavator arm, which may be a rotation of more than 1700 in the emptying curl direction from the level orientation), or in response to lesser rotation, e.g. 600 or more in the digging curl direction (i.e. into or towards the crowd position). Adjusting the position of the pivot point of the member relative to the centre of gravity of the member provides for different angle ranges in that regard where the pivot axis runs transverse across the coupler, e.g. between sideplates of the coupler. Further, undesired rotations for the member can be avoided, or rotation limits can be provided, by pivot stops.

It should also be noted that the former of the two decoupling positions (i.e. a position curled up and above the excavator arm) is the less desirable position for the coupler during a decoupling of the accessory from the coupler. That is because it positions the coupler at a significantly more elevated position than that achieved in the crowd position. As a result, such a position would never be used in practice. It should also be noted that such a position serves no useful purpose, and thus is an unlikely position for an operator to put the coupler into.

It is also preferred that a decoupling of the accessory from the coupler is not an automatic result of a single act of (at least partially) inverting the coupler. With the preferred embodiment of the present invention, there is also a primary coupling mechanism, with the gravity operated member providing just a secondary securement function, for example of being an automatic tether. As a result, the mere reorientation of the coupler into a position that moves the gravity-operated member into an open or unlocked position will not actually decouple the accessory from the coupler. The primary coupling mechanism would also need to be disengaged or retracted before that could happen.

It should also be noted that when a coupler is in a fully inverted orientation (i.e. up above the excavator arm, and rotated by more than 1700 from the level orientation), the weight of the accessory will be bearing directly down onto the coupler. The weight of the accessory, therefore, should keep the accessory on the coupler.

The accessory also cannot be released while the weight of the accessory is forcing the attachment pin to press into the back of the jaw. That, therefore, is a preferred state for the coupler at the time of decoupling. That state is achieved for example by reorienting the coupler into the crowd position. Then, to withdraw the attachment pin from the jaw in that orientation, the weight of the accessory will be rested on the floor or the like, preferably in a stable manner (e.g. on a flat bottom surface of the accessory or on a stand for the accessory), and then the weight of the accessory on the ground is used to keep the accessory stationary while the jaw is disengaged from the attachment pin of the accessory by manipulation of the excavator arm and the coupler relative to that accessory in an appropriate manner (after disengagement of any primary coupling mechanism).

The present invention therefore allows the decoupling of an accessory from the coupler by the use of specific and deliberate reorientations and manipulations, which acts would not be carried out during normal excavation operations. As a result, the accessory cannot be decoupled from the coupler accidentally. Thus the present invention will provide remarkable reassurances to an excavator operator.

The present invention also provides various methods of coupling an accessory onto a coupler that is attached to an excavator arm of an excavator.

The present invention also provides various methods of uncoupling an accessory from a coupler that is attached to an excavator arm of an excavator.

BRIEF DESCRIPTION OF THE SEVERAL VIEWS OF THE DRAWING(S)

These and other preferred features and embodiments of the present invention will now be described purely by way of example with reference to the accompanying drawings in which:

FIG. 10 shows a part sectional side elevation view of a coupler illustrating a further embodiment of the present invention;

FIG. 11 shows the same part sectional/side elevation view of the coupler of FIG. 10, but in which the member is in its second, jaw-closed position;

FIG. 12 shows a front elevation view of the coupler of FIGS. 10 and 11 with the member in its jaw-closed position;

FIG. 13 is a detail side view of the gravity-operated member of FIGS. 10, 11 and 12;

Figure 17:
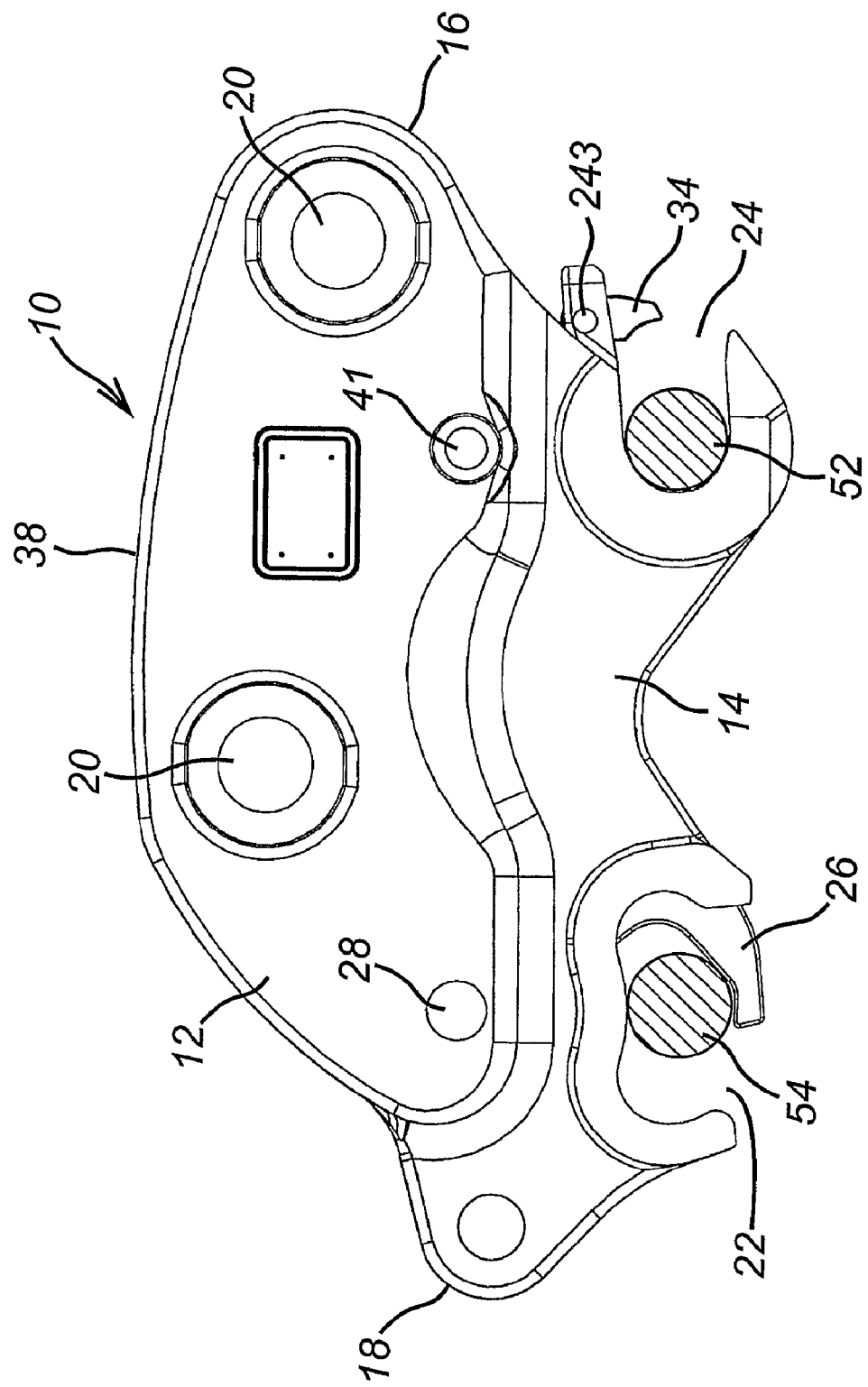
FIG. 17 is a side elevational view of a further coupler in accordance with the present invention.
Figure 18:
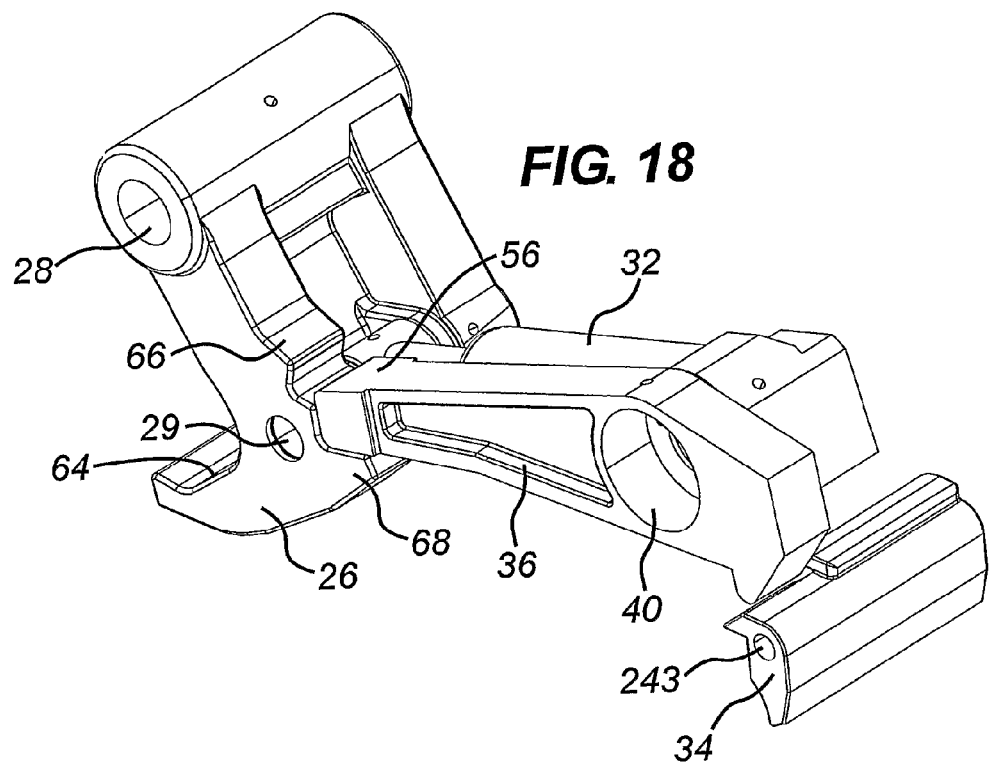
FIG. 18 shows the internal working mechanisms of the coupler of FIG. 17.
Figure 24:
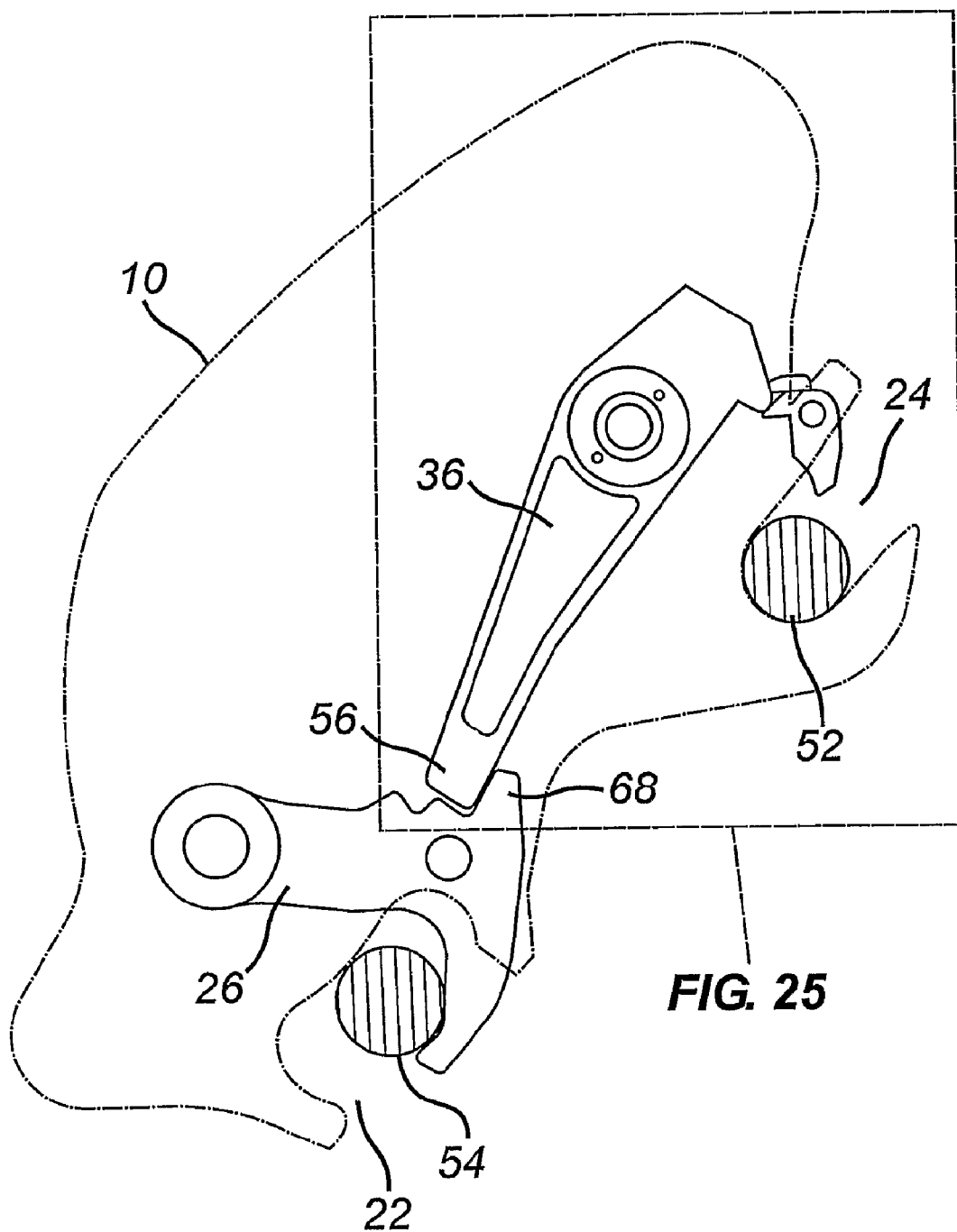
Figure 25:
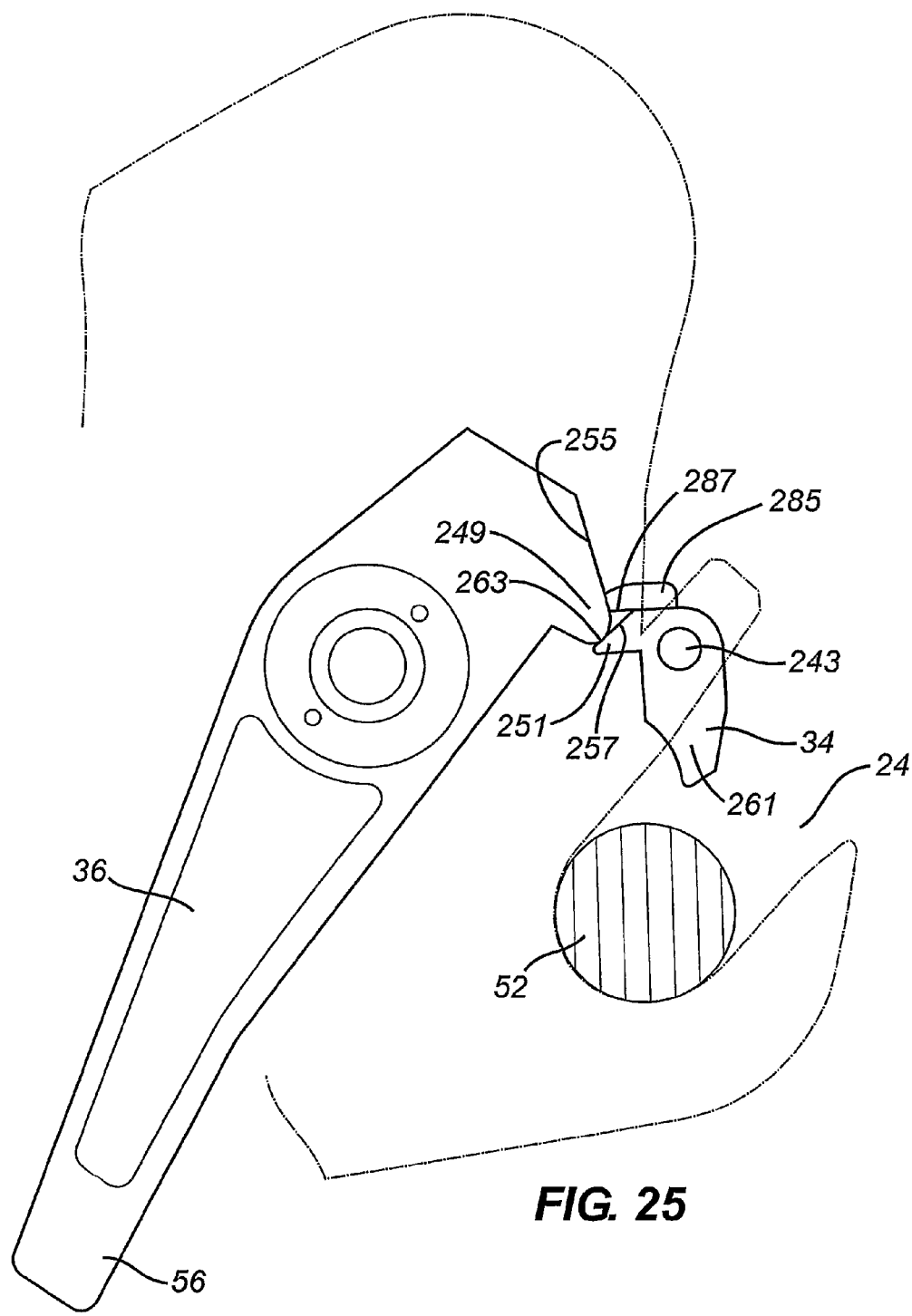
Figure 31:
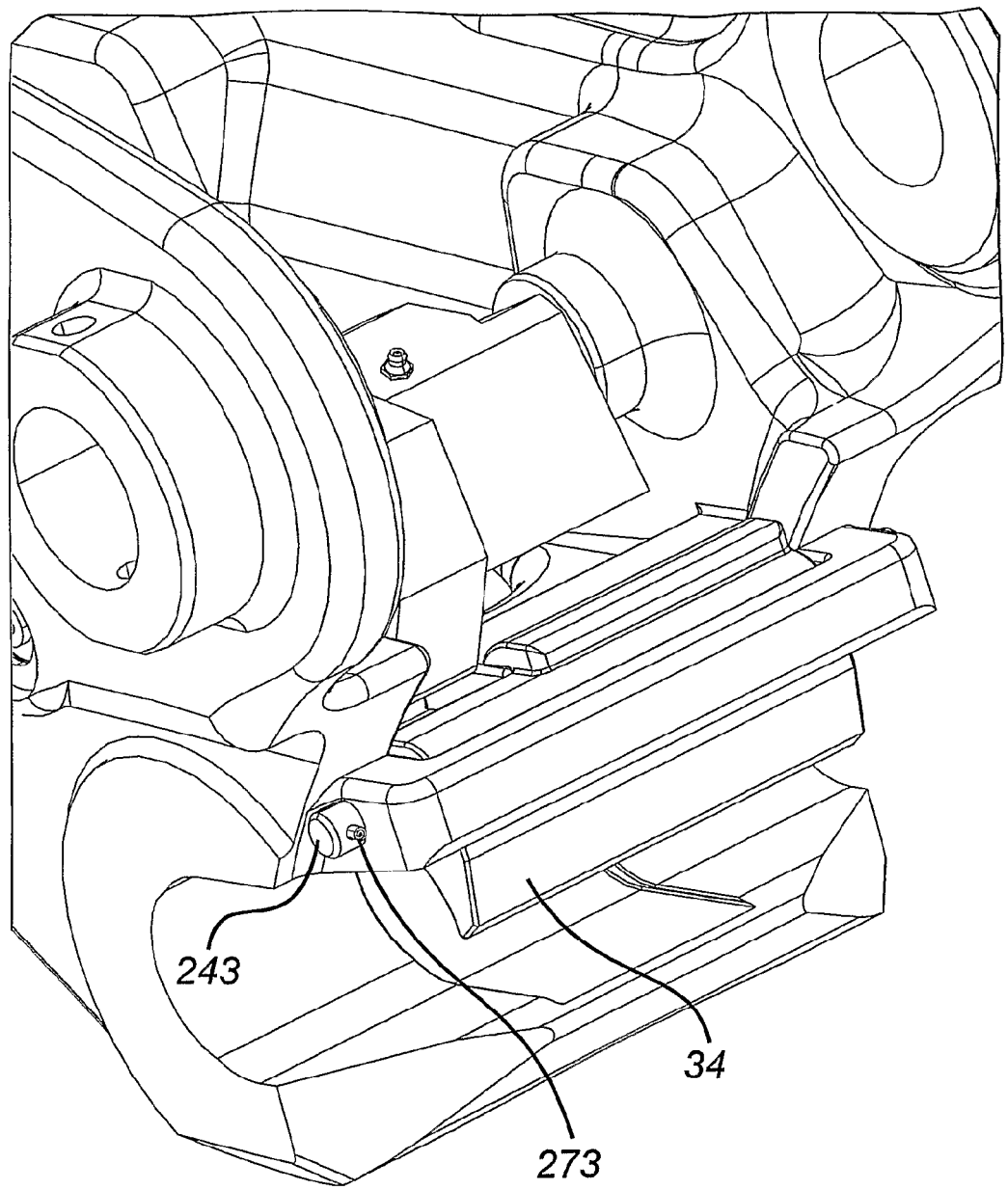
Figure 32:
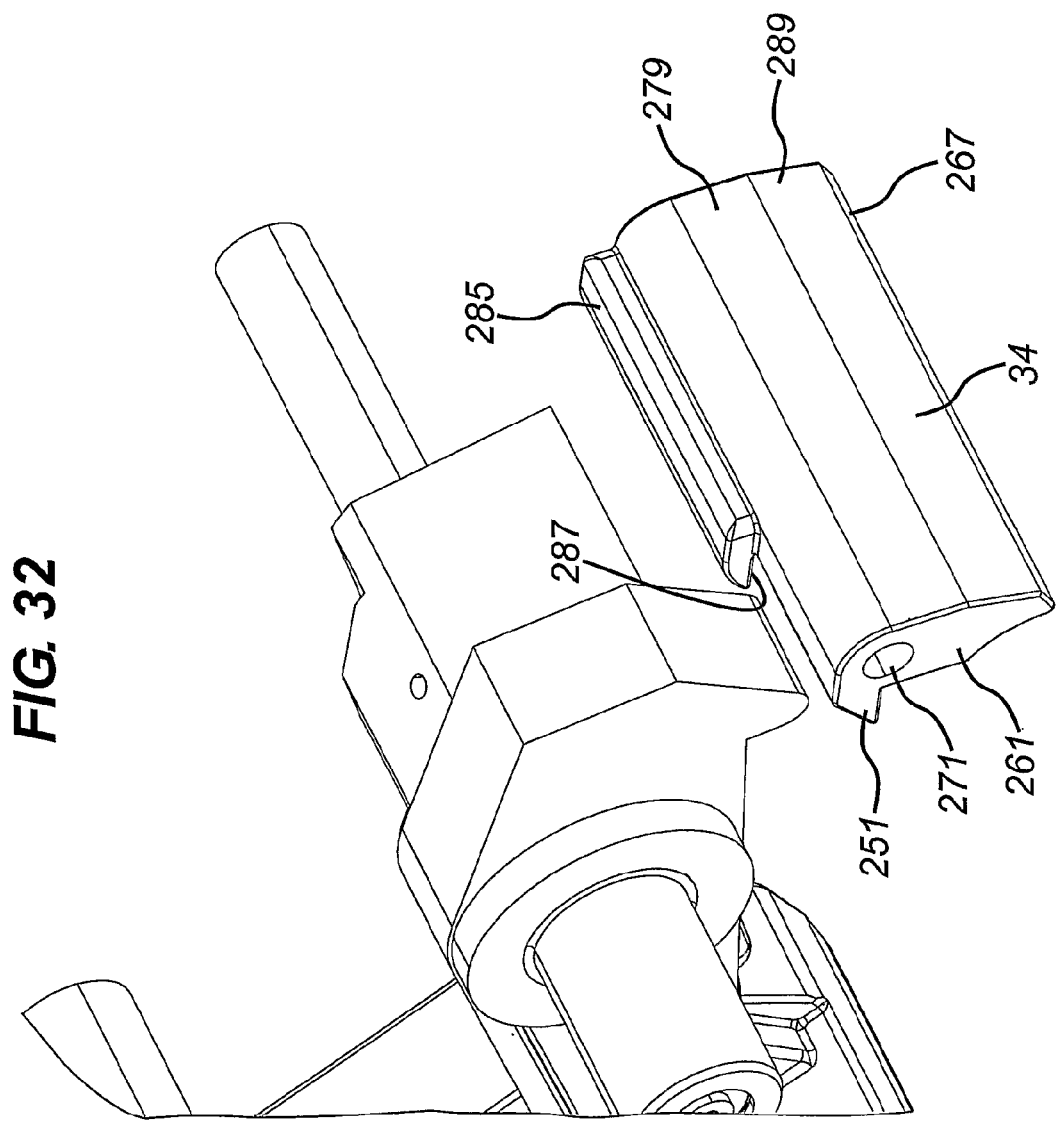
Figure 33:
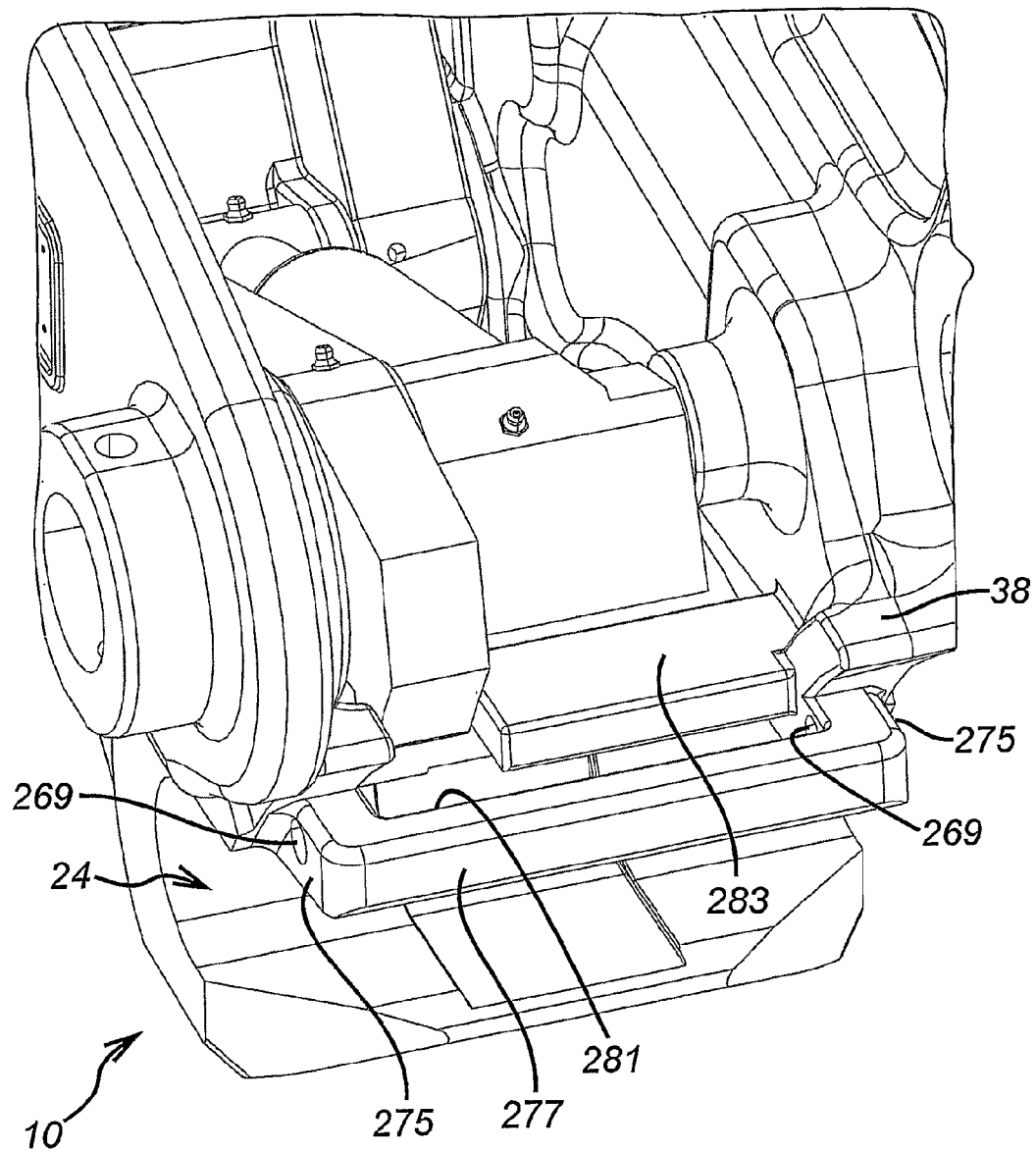

FIGS. 20 to 23 schematically illustrate the operational steps involved for attaching an accessory to the coupler of FIG. 17;

FIGS. 24 and 25 show the coupler of FIG. 17, rotated by 45° from horizontal, for illustrating the movement restricting function of the mechanical stop for the gravity operated member;

FIGS. 26 to 30 schematically illustrate the operational steps involved for disengagement of an accessory from the coupler of FIG. 17; and FIGS. 31, 32 and 33 show details of the interactions between the gravity operated member and the frame of the coupler.

DETAILED DESCRIPTION OF THE INVENTION

Figure 1:
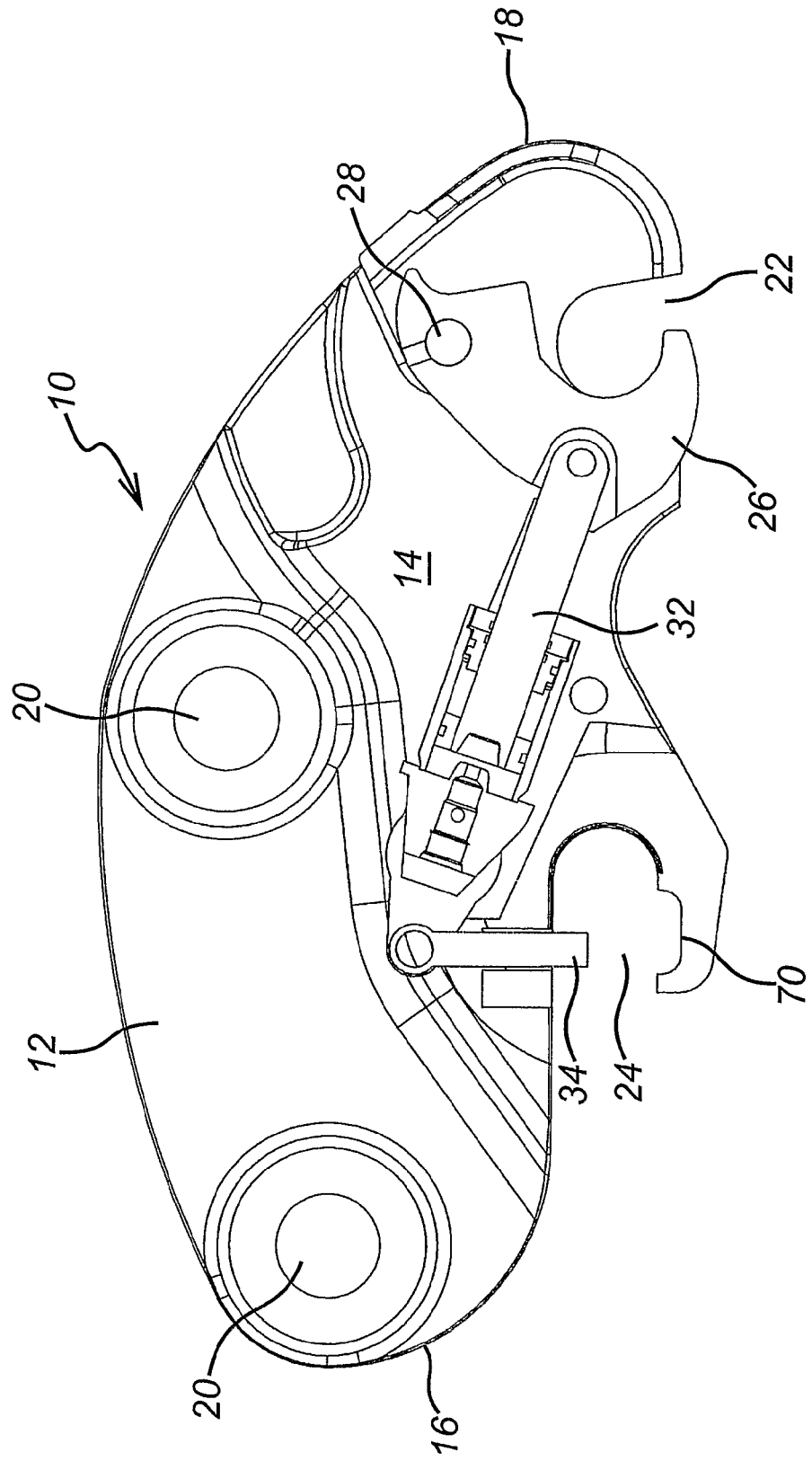
FIG. 1 is a cut-away side elevation of a preferred embodiment of the present invention.

Referring first of all to FIG. 1, a cut-away side elevation of a preferred coupler 10, showing the preferred internal working mechanisms for the coupler 10 of the present invention, is shown. The coupler 10 has a first, or upper, portion 12 and a second, or lower, portion 14. The coupler also has a front 16 and a rear 18. In normal use the front 16 points towards the cab of an excavator (not shown), whereas the rear 18 points away from the cab.

The upper portion 12 is adapted for connecting the coupler 10 onto the excavator arm of the excavator and it is displaced slightly forwardly relative to the lower portion 14, as is conventional. In this illustrated embodiment, however, it is displaced further forward than would be conventional. That, however, is optional.

In the upper portion 12, two pairs of holes 20 are provided, although only one of each pair is shown. Those holes 20 are for attachment of the coupler 10 to the excavator arm of the excavator by using a pair of attachment pins. That attachment is conventional in the art, and thus needs no further discussion.

The lower portion 14, which is instead for coupling onto an accessory, such as an excavator bucket, instead uses a pair of jaws for that attachment. The first jaw, or the rear jaw 22, and the second jaw, or the front jaw 24, conventional as well for that purpose, and thus are sized to receive a further pair of attachment pins, this time fitted to the accessory.

As is conventional now, the rear jaw 22 is a downwardly facing jaw whereas the front jaw 24 is a forward facing jaw. Thus, with this arrangement, the basic principle behind coupling an accessory to the coupler is first to locate a front attachment pin of the accessory within the front jaw 24 and then to swing a rear attachment pin of the accessory into the rear jaw from below. Next, to prevent that second pin from just swinging out of the rear jaw, a pivoting latching hook, or first latch 26, is associated with that rear jaw 22 such that it can be swung about a pivot 28 into a latching position across the rear jaw 22 to secure the second attachment pin within the rear jaw 22. That then secures the accessory firmly onto the coupler 10.

As is also conventional, in this preferred embodiment the pivoting latching hook 26 is driven into that latching position by a mechanical actuator such as a hydraulic ram 32.

However, instead of a hydraulic ram, a pneumatic ram or a screwthread drive, or some other drive device, might be provided.

Further, instead of a pivoting latching hook, a sliding mechanism for that latch might 5 instead be provided.

The present invention is distinguished over prior art couplers, however, by the provision of a unique second latch 34, and an attached third latch, or mechanical stop 36. They are provided to interfere with the above basic principle of operation of the coupler so as to prevent inadvertent, or non-deliberate, disengagement of the accessory from the coupler 10, while still allowing deliberate disengagement of the accessory from the coupler.

The second latch 34 is associated with the front jaw 24 and it is adapted selectively to close the front jaw 24 for securing an attachment pin within the front jaw 24. Because of that latch 34, before the accessory can be decoupled from the coupler 10, steps have to be taken to cause that latch to retract for opening the front jaw 24. Further details of those steps, and the more specific details of that second latch, will now be described in further detail with reference to FIGS. 2 to 8.

Figure 2:
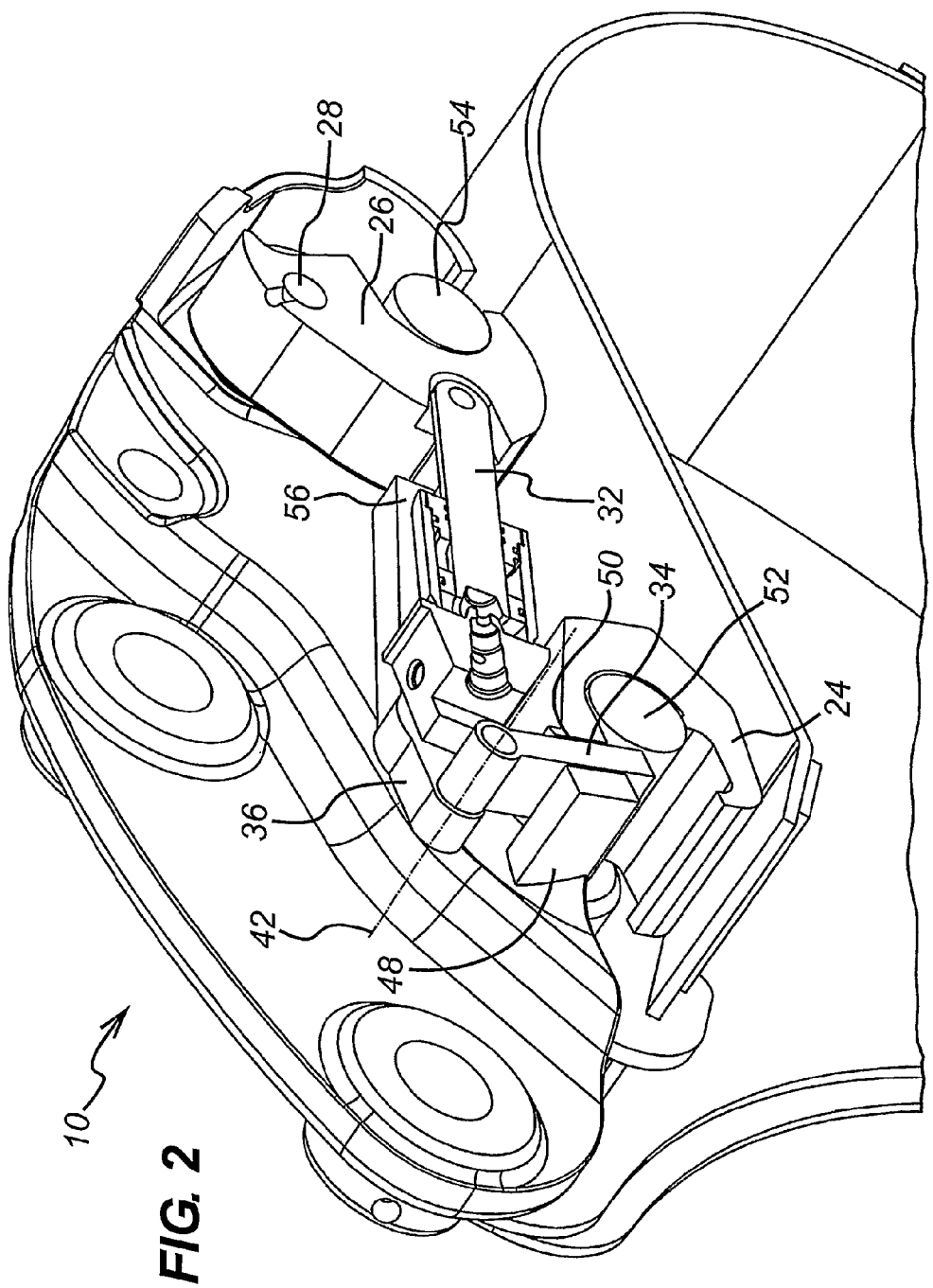
FIG. 2 is a schematic cut-away perspective of a preferred embodiment of the invention with two attachment pins of a bucket (part illustrated) secured within the two jaws of the coupler.

As can be seen in FIG. 2, which shows only one half of the second latch 34, the second latch 34 is a pivotal plate connected via a hinge to a third element 36. The plate is generally rectangular with a solid section and is preferably made from steel. Its hinge has a central axis 42.

The second latch 34 can drop in and out of a latching position within the front jaw 24 by sliding generally linearly through a slot defined by two plates 48, 50. It can keeps a generally linear line of movement since it can pivot about its own pivot axis 42, i.e. relative to the third element 36. Further, its interaction with the two plates 48, 50 within that slot defined therebetween, prevents rotation of the second latch 34 relative to main body of the coupler 10, and relative to the front jaw 24.

In an alternative construction, however, the second latch 34 and the mechanical stop 36 may be a single unitary element, thus not needing at least the front plate 48 of the two plates 48, 50.

The third element 36 is a mechanical stop 36. As more clearly shown in FIG. 3, in which the hydraulic ram 32 has been removed for clarity, the mechanical stop 36 is itself also a pivotal member—it is pivotally mounted relative to the main body 38 of the coupler 10 about a pivot pin (not shown) via a bearing hole 40 in the mechanical stop 36. Thus the mechanical stop 36 can pivot relative to the main body 38 of the coupler 10.

The mechanical stop 36 has a first arm with an end 56 that extends away from the bearing hole 40 away from the second latch 34. It also has a second arm extending away from the bearing hole 40, but instead towards the second latch 34. That second arm carries the pivot axis 42 for the second latch 34 near its end and that axis is located directly above, or in line with, the slot defined between the two plates 48, 50 of the front jaw.

As a result of that geometry (of the mechanical stop relative to the axes and the slot of the front jaw), it is through the pivoting motion of the mechanical stop 36 about the central axis of its bearing hole 40, i.e. relative to the main body of the coupler, that the second latch 34 can be lifted or lowered generally linearly through the slot between the two plates 48, 50.

Figure 3:
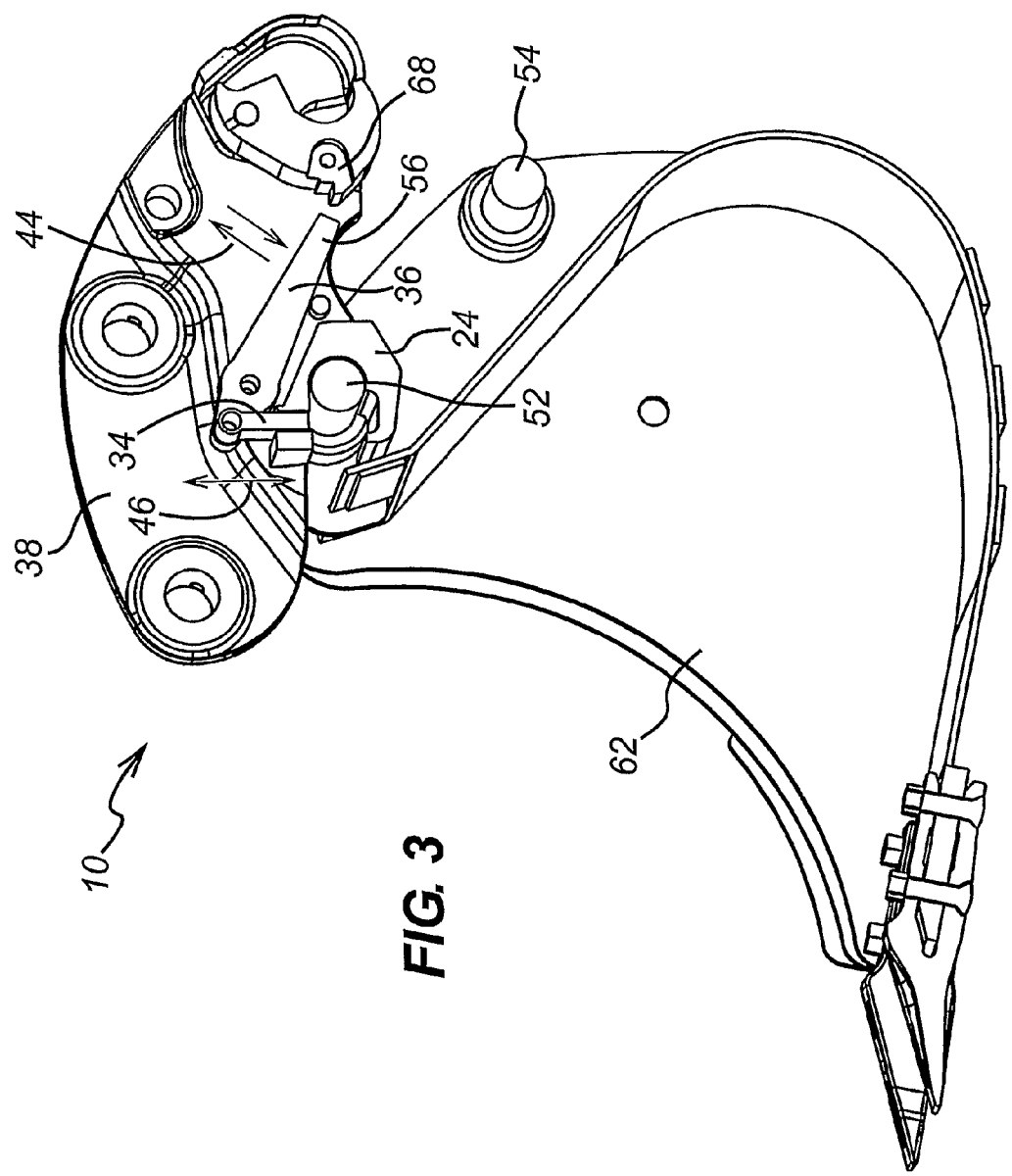
FIGS. 3 to 8 are schematic cut-away perspectives of the embodiment of FIG. 2 illustrating the preferred sequence of operations for firstly attaching an attachment to the coupler (FIGS. 3 to 5 and then for disengaging the attachment from the coupler (FIGS. and 6 to 8)

The pivotal movement of the mechanical stop 36 is illustrated by the arrows 44 in FIG. 3.

The generally linear motion of the second latch 34 relative to the front jaw 24 is illustrated by the double headed arrow 46 also in FIG. 3.

It is preferred that the first arm of the mechanical stop, i.e. the arm extending from the bearing hole 40 to the end 56, is at least twice as long as the second arm of the mechanical stop 36, i.e. the arm extending from the bearing hole 40 towards the second latch 34. Similarly it is preferred that that first arm of the mechanical stop is at least twice as long as the second latch 34. Those arrangements together should allow the second arm to have a greater moment of inertia about the bearing hole 40 than the second arm combined with the second latch 34. Similarly, or alternatively, the first arm may simply be sufficiently heavier than the second arm and second latch combined to provide the desired greater moment of inertia for that first arm about the bearing hole 40 than the second arm and second latch 34 combined. This moment of inertia arrangement is desired so that gravity can always cause the first arm to drop and the second arm to lift, whenever the orientation of front and rear of the coupler is altered with respect to one another. This is the desired arrangement despite the fact that that arrangement tends to cause the second latch 34 to be permanently biased towards a non-latching position when the coupler 10 is in a normal use orientation, i.e. with the attachment being located underneath the coupler. That is because in normal use the second latch 34 will not be able to lift fully up into the roof of the front jaw 24 for opening the front jaw 24 due to the first latch 26 interfering with the range of motion available to the mechanical stop 36. Instead, the second latch's normal position during use is as shown in FIG. 2—it extends partially across the opening of the front jaw 24. That is sufficient for "closing" the second jaw for locking an attachment pin within the second jaw. This feature is further explained below with regard to attaching and detaching an accessory to and from the coupler.

Returning, however, to the design of the second latch 34, in preferred embodiments the second latch 34 is painted in a high visibility colour such as orange or red. That is preferred since the second latch is one of the safety features of the coupler that will nearly always be visible from the cab of the excavator—it at least partially extends across the opening of the front jaw 24, and that opening generally faces towards the cab during normal use of accessories. The high visibility second latch 34, therefore, acts as a visible marker for confirming the correct or secure attachment of an accessory to the coupler 10, and that visual aid can be seen by the excavator operator from the within his cab.

For securing the rear attachment pin 54 within the rear jaw 22, however, this preferred embodiment has a first latch 26 in the form of a pivoting latching hook. That pivoting latching hook is mounted for rotation about a pivot pin 28 and is moveable between a latching position and a non-latching position by a hydraulic ram 32. That hydraulic ram 32 is the primary mechanism for holding that first latch 26 in its latching position. To assist with that and to add to the security of that, it is preferred that the hydraulic ram is provided with a check valve to prevent a release of the hydraulic pressure on the ram in the event of a hydraulic failure such as a cut in the hydraulic piping leading to it.

The mechanical stop 36, however, provides a further backup to prevent the inadvertent or non-deliberate release or retraction of the first latch 26 into a non-latching position. To that end the mechanical stop 36 provides an interference function against that first latch 26, as most clearly illustrated in FIG. 5.

For providing that interference function, the first arm of the mechanical stop 36 extends away from the bearing hole 40, and away from the second latch 34, towards the first latch 26. Further its length is long enough to bear against the first latch 26 when the first latch is in a latching position against an attachment pin. However, the first arm is not too long—it needs to be able to swing past the first latch 26 when the first latch 26 is fully extended, i.e. when there isn't an attachment pin within the rear jaw.

Because of the mechanical stop 36, i.e. when the first latch is in a latching position against an attachment pin, the first latch 26 cannot be retracted even by the hydraulic ram 32 until that mechanical stop 36 has been moved from that interference position.

Figure 4:
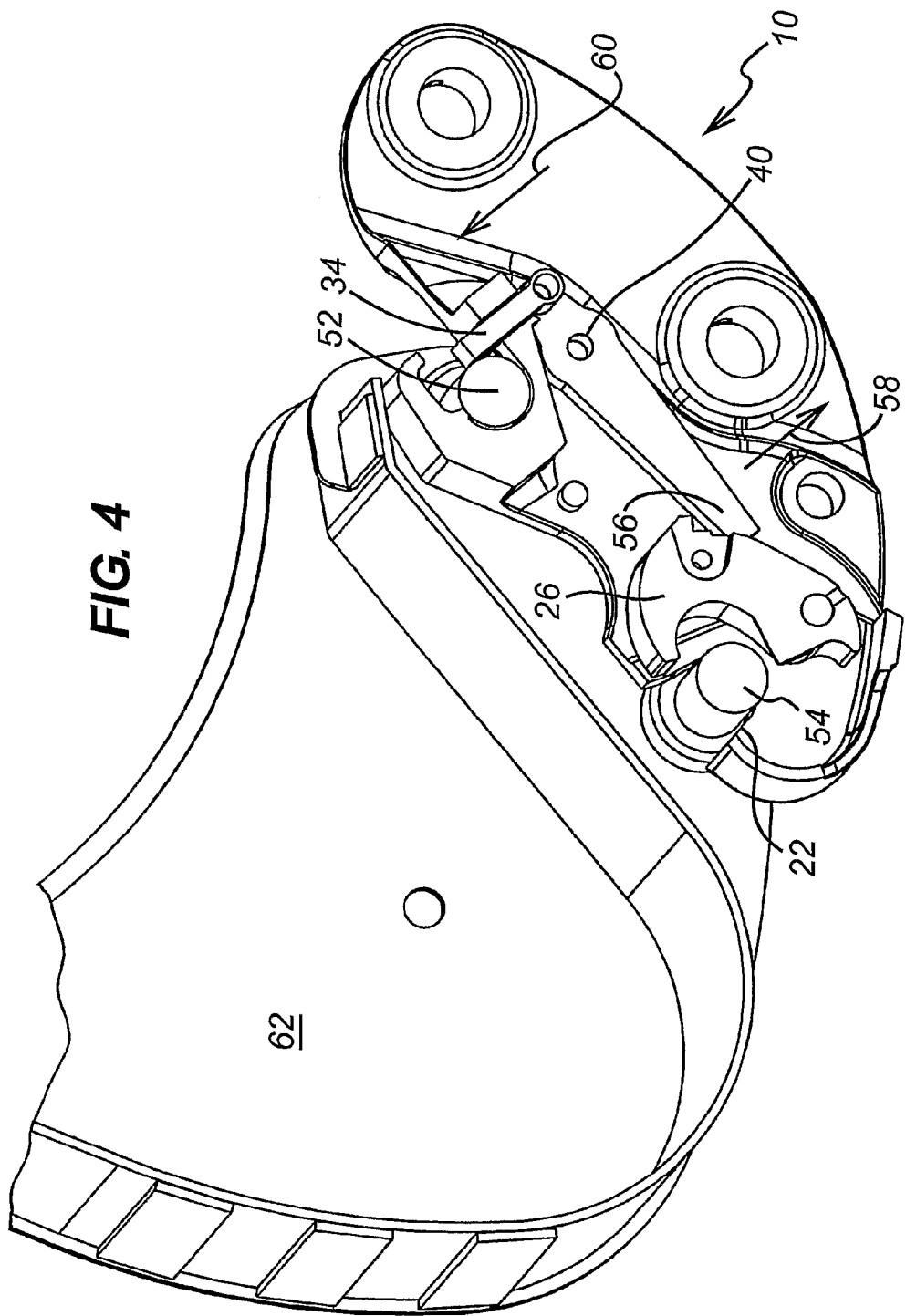

The movement of that mechanical stop 36 is achieved by inverting the coupler 10, as shown in FIG. 4, by fully curling the bucket and coupler under the excavator arm using the hydraulics of the excavator arm of the excavator. fu that inverted position, due to the moments about the bearing hole 40, the mechanical stop 36 will rotate under the influence of gravity so as to move its end 56 that was in engagement with the first latch 26 away from the first latch 26. That rotational movement is in the direction shown by the downwardly pointing arrow 58 in FIG. 4.

It should also be observed that that rotation of the mechanical stop 36 does not open the front jaw 24 since the second latch 34 is still extending partially across the opening of the jaw 24—it actually closes it further, as shown by the upwards arrow 60 in FIG. 4. Upon that rotation of the mechanical stop, the first latch 26 is free to be retracted from its latching position into a non-latching position by the hydraulic ram 32 (not shown in FIG. 4 either, again for clarity). Thus, the rear jaw 22 can be opened (as shown in FIG. 4).

Figure 5:
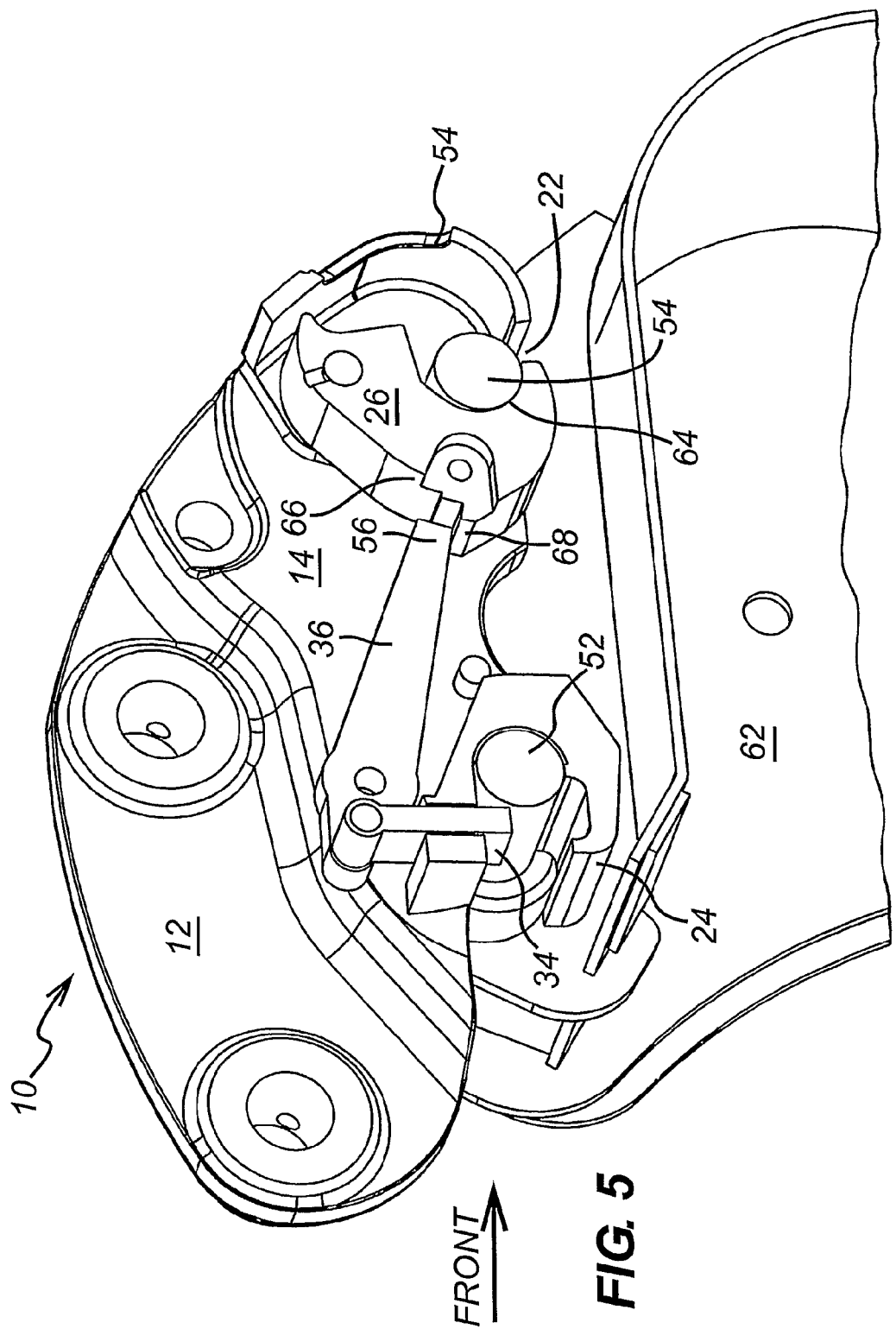

Although the basic operations of the three latches have been described above, the preferred method for attaching an accessory, such as a bucket 62, to the coupler 10 will now be described with reference to FIGS. 3,4 and 5.

Referring first to FIG. 3, the first step in the attachment procedure is the engagement of the front jaw 24 of the coupler onto the front attachment pin 52 of the bucket 62. That is usually done while the bucket 62 sits on the ground and is achieved by manipulation of the coupler 10 relative to the bucket 62, while the coupler is in its normal upright orientation. However, before that can be done, the front jaw 24 needs to be open, i.e. the second latch 34 needs to have been lifted into or above the roof of the front jaw 24.

The front jaw is likely to be open if the last operation with the coupler was the disengagement of the coupler from an accessory. However, if it is not open, to open it the second latch 34 must be lifted. That, however, can only be done while the rear jaw 22 is not accommodating an attachment pin, and only when the first latch has been driven rearwardly to a fully extended position. That can usually be done by using the hydraulic ram 32, as shown in FIG. 3.

Once the first latch 26 is fully extended, or while it is being fully extended, the mechanical stop 36 falls clear of the first latch 26 once it is no longer able to reach the first latch 26 to bear against it. That additional rotation of the mechanical stop is then enough to lift the attached second latch 34 clear of the front jaw 24, i.e. fully into or above the roof of the front jaw 24, to open that jaw 24.

Once the front attachment pin 52 of the bucket 62 has then been engaged into the front jaw 24 of the coupler 10, the hydraulics of the excavator arm are then powered up to curl the bucket 62 and the coupler 10 under the excavator, i.e. towards the cab, so as to invert the coupler 10. That positions the bucket 62 roughly above the coupler 10, as shown in FIG. 4. During that rotation of the coupler, the mechanical stop 36 will again fall under the influence of gravity to rotate it in the direction shown by the single downward arrow 58 in FIG. 4. Thus the end 56 of the mechanical stop passes the first latch 26 again.

Further, as that happens the weight of the bucket will keep the front attachment pin securely in the cradle of the front jaw. Thus the second latch will be able to slide back partially across the opening of the front jaw 24 to close the front jaw 24 for securing the front attachment pin 52 within that front jaw 24.

While the above is happening, the first latch 26 remains fully extended. Thus it prevents the passage of the rear attachment pin 54 of the bucket 62 into the rear jaw 22 of the coupler 10. However, once the above has happened, the first latch 26 can then be retracted by the hydraulic ram 32 to open the rear jaw 22—the mechanical stop 36 is moved clear of the first latch so it will not prevent that from happening.

Next, as the first latch 26 is retracted, the rear jaw opens and eventually the rear attachment pin 54 will fall into that jaw 22 under the weight of the bucket. Then the first latch 26 can be powered back to a latching position by the hydraulic ram. The bucket 62 and coupler 10 can then be reinverted to the position or orientation of FIG. 5—the normal working orientation—by uncurling the arrangement with the excavator arm.

During that uncurling operation the final part of the coupling procedure occurs—the mechanical stop falls back down into an interference position, i.e. with its end 56 bearing against the first latch 26.

From the above it will be appreciated that it is important that the front jaw is openable sufficiently by the movement/rotation of the mechanical stop to allow an attachment pin to be engaged into the front jaw, and also for it to remain sufficiently closed during normal use, i.e. while the mechanical stop is in a latching position, to prevent removal of the attachment pin from the front jaw. That balance is more readily achieved if the latch only extends partially across the front jaw when the mechanical stop is in its latched position. Thus the length of the second latch 34 is preferably chosen such that with the mechanical stop in a latching position, the second latch extends only approximately half way across the opening for the front jaw 24. However, adjusting the relative the lengths of the arms of the mechanical stop 36 will adjust the amount of lift/movement available for the second latch 34 by the rotation of the mechanical stop 36 into its fully dropped position from its latching position. Similarly, adjusting the location of any lower rotation stop for the mechanical stop can adjust the amount of lift/movement available for the second latch 34 by the rotation of the mechanical stop 36 into its fully dropped position from its latching position.

In this preferred embodiment the first latch 26 is a hook having an attachment pin facing surface 64 and a back surface 66. The end 56 of the mechanical stop 36 can bear against that back surface 66 when the mechanical stop 36 is in a latching position. However, to provide a more precise latching position for the mechanical stop 36, The back surface 66 of the first latch 26 is provided with a flange 68 having at least one step. This stepped flange 68 provides a seat onto which the mechanical stop's end 56 can sit when it is in its latching position behind the first latch 26. Further, if more than one step is provided, each step provides an alternative seat for the mechanical stop's end 56, whereby attachments with different pin spacings can be accommodated more readily by the coupler 10—as shown in FIG. 3, two or even three steps are preferably provided on the flange 68, with each step providing a corresponding latching position for the mechanical stop 36, depending upon the amount of extension needed by the first latch 26 for its attachment pin facing surface 64 to engage the attachment pin of the respective accessory.

Instead of multiple steps on the flange, the end 56 of the mechanical stop could instead be stepped.

In the illustrated embodiment, the rear jaw is relatively narrow. Thus only a narrow range of accessory pin spacings can be accommodated by that coupler 10. However, that rear jaw 22 could be widened slightly to widen the range of accessory pin spacings accommodatable by the coupler.

The flange 68 also serves a second purpose. It provides more control for the operation of the mechanical stop both in its latching position and between its latching position and it fully dropped position (i.e. for opening the front jaw). By having the flange with the step, the exact state of rotation of the first latch will not define whether the mechanical stop is in a latching position. That is because it is in a latching position whenever it bears onto the step. Thus the mechanical stop will only fall past that latching position when the operator wants it to do so, i.e. by fully powering forward the first latch 26 when there isn't an attachment pin in the rear jaw 22.

Next, with reference to FIGS. 6, 7 and 8, the removal of a bucket 62 from the coupler 10 will now be described.

Figure 6:
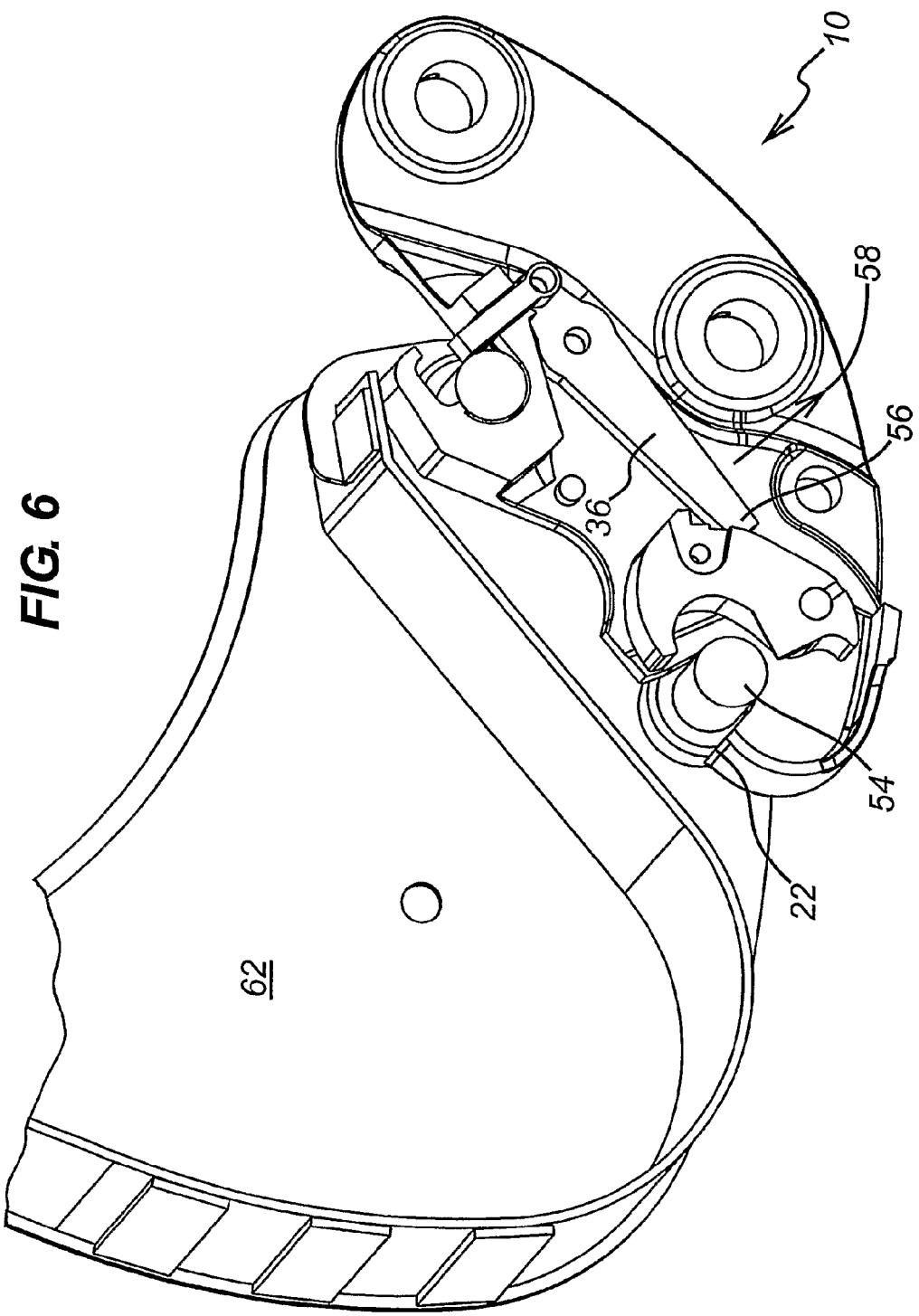

Referring first to FIG. 6, the first step in decoupling a bucket 62 from the coupler 10 is to invert the bucket 62 and coupler 10 so as to place the bucket 62 roughly above the coupler 10. That in turn causes the mechanical stop 36 to rotate clear of its latching position behind the first latch 26, as shown by arrow 58. The hydraulic ram 32 can then be powered to retract the first latch 26 for opening the rear jaw 22.

Figure 7:
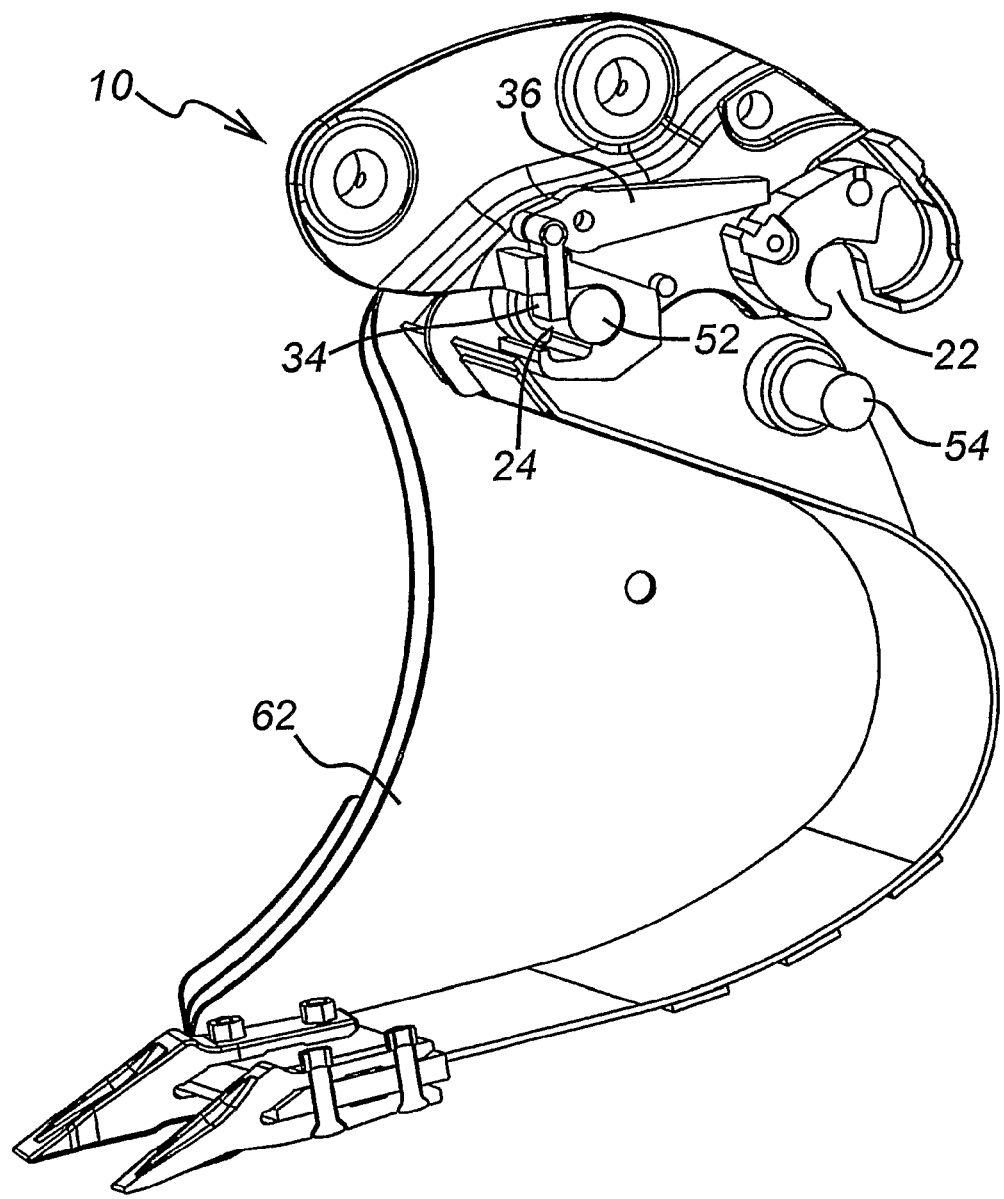
Figure 8:
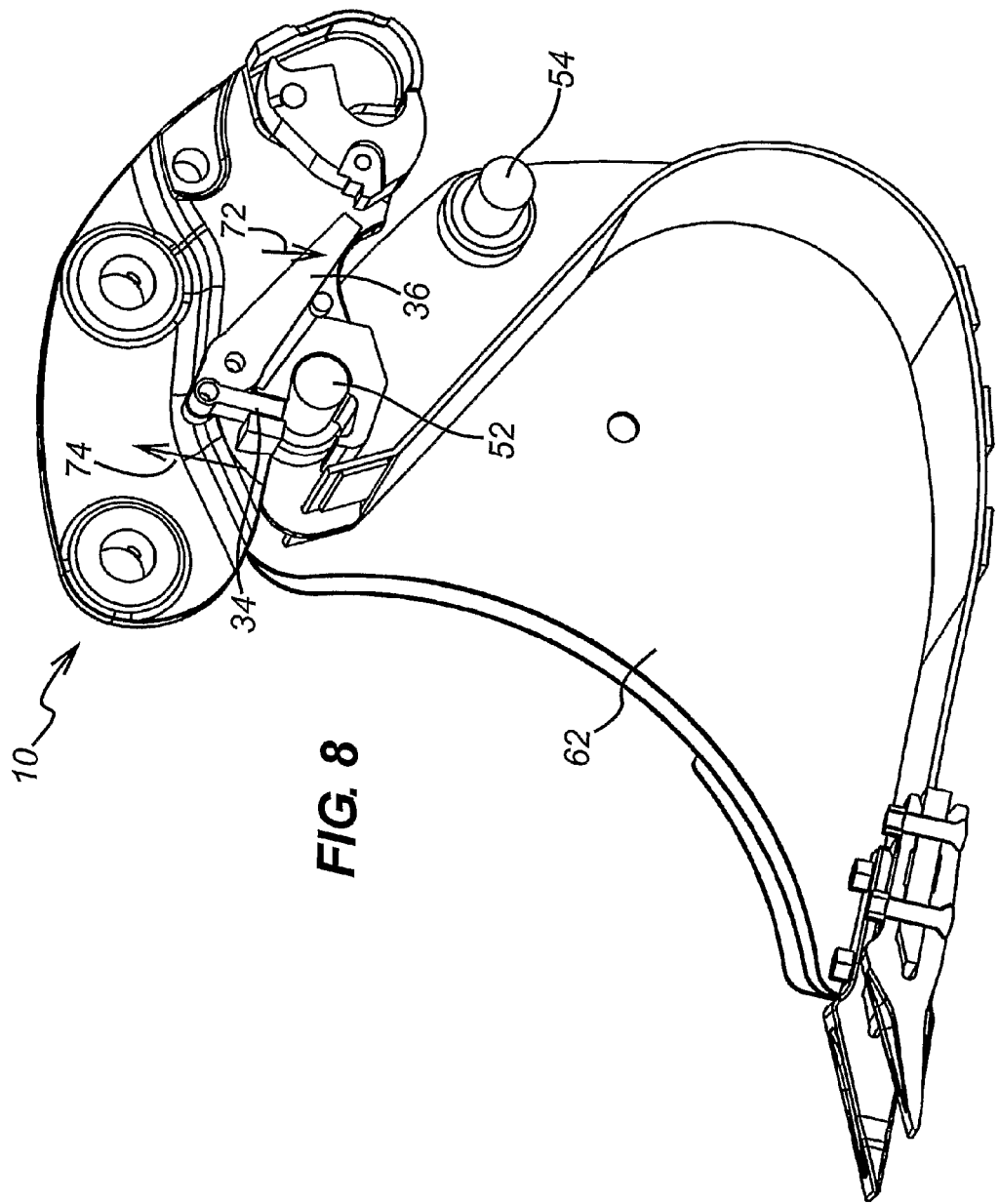

Once that has been done, the bucket 62 and coupler 10 are then reinverted to the normal orientation of FIG. 7. That in turn allows the rear attachment pin 54 to swing free from the open rear jaw 22, as shown. The front attachment pin 52, however, is still secured within the front jaw 24 by the second latch 34. Thus even if free swinging, the bucket 62 still will not detach from the coupler 10. Before that can happen it is necessary to release the front attachment pin 52 from that front jaw 24.

To release the front attachment pin 52 from the front jaw 24, the bucket 10 would first normally be seated onto the ground to make it safe. Then the hydraulic ram 32 is again powered, but this time to drive the first latch 26 into its fully extended position, as in FIG. 3 above, but as now shown in FIG. 8. That in turn allows the mechanical stop 36 to fully drop into the final bucket release position (as shown by arrow 72) in which it lifts the second latch 34 clear up into the roof of the front jaw 24 (as shown by arrow 74). Only then is the front attachment pin 52 also then free to be removed from the front jaw 24.

One final safety feature is incorporated into this coupler. That is the provision of a recess 70 in the floor of the front jaw 24 (see FIG. 1). That recess, in this illustrated embodiment has a width of approximately the same length as the height of the jaw's opening. An attachment pin can thus locate into it. That recess 70 makes it even more unlikely that the front attachment pin will disengage from the front jaw unintentionally. That is because even if the rear attachment pin is already free and the front jaw is open, a free swinging bucket in that open front jaw will still not tend to fallout of the jaw. Instead the pin will tend to locate into the recess within that front jaw. Further, one in the recess, it will not readily come out of it due to the weight of the bucket. Thus, only when the bucket is on the ground, or shaken vigorously, will the removal of the bucket from that jaw be facilitated. That is because only then will the weight of the bucket 62 be taken off the jaw 24 of the coupler 10. That in turn allows the coupler 10 to be more readily manipulated in a suitable manner relative to the jaw to free the front attachment pin 52 from the front jaw 24.

Figure 9:
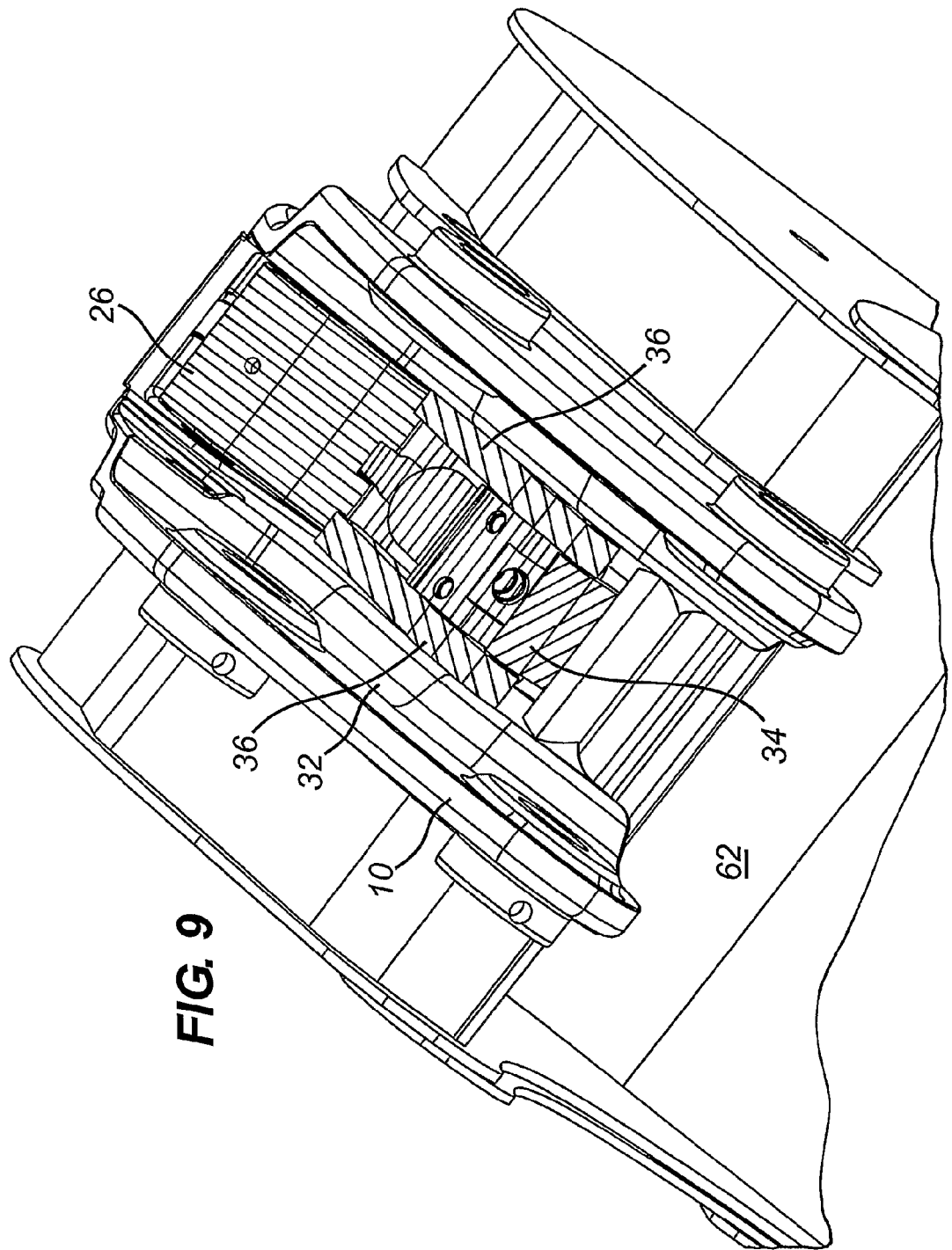
FIG. 9 is a top perspective view of the preferred coupler, with an attached bucket (in part) illustrating the preferred elements of the coupler roughly in plan.

Referring finally to FIG. 9, a top plan view of the working elements of the preferred coupler is provided. From that view it is clearly visible that the second latch 34 lies between a pair of mechanical stops 36. However, other configurations within the scope of the claims as appended hereto would be acceptable as well. The pair of mechanical stops 36, the hydraulic ram 32, the first latch 26 and the second latch 34 have each been shaded with different hash lines to help identify them in the figure.

It can also be noted from FIG. 9 that in this preferred embodiment has the hydraulic ram 32 sitting generally between the two mechanical stops 36. That provides a more compact arrangement of the coupler 10 in its height dimension, whereby the bucket's digging capacity will be less compromised by the use of a coupler between the excavator arm and the bucket.

Referring next to FIG. 10, a further embodiment of the present invention is shown. The coupler 110 comprises a top side 112, a bottom side 114, a front 116 and a rear 118. The coupler also comprises sideplates 120 (see FIG. 12).

In the top side 112, two holes 122 are provided for attachment of the coupler 110 to an excavator arm of an excavator in a conventional manner, i.e. with two attachment pins (not shown).

In the bottom side 114, a front jaw 124 and a rear jaw 126 are provided for receiving two further attachment pins (not shown), this time of an accessory (also not shown) for attachment of the accessory to the coupler 110 again in a generally conventional manner. Indeed, for this embodiment, a primary coupling mechanism (not shown) for that purpose can consist of a pivoting latching hook and hydraulic cylinder as disclosed in GB2359062. However, for simplicity, those features have not been shown in the drawings. For completeness, however, the disclosures of GB2359062 are incorporated herein by way of reference, and as such, a full discussion of the primary coupling mechanism is not required herein. The drawings do, however, show three apertures 28 that pass through both of the sideplates 120 of the coupler 110 which are for receiving a locking pin (through just one pair of them) for locking the latching hook in its latched position, as disclosed in GB2359062.

The present invention, however, has an additional feature that is not disclosed in GB2359062. That is the gravity-operated member 130, as most clearly shown in FIG. 13. That gravity-operated member 130 is a toggle in an upper wall 132 of the front jaw 124. The jaw is otherwise of a generally conventional configuration, having a moulded lower wall (of a pointed type, with a pointed front 133) and the upper wall, with the opening 131 for the jaw 124 being defined therebetween.

The toggle is mounted within a hole 134 in the upper wall 132 and is mounted for rotation about a pivot axis, as defined by a peg or bolt 136 that passes through the hole 134 in a transverse direction (i.e. transverse to the sideplates 120 of the coupler 110). The head 135 and nut 137 of the bolt are shown in FIG. 12.

The toggle may pivot about the bolt 136 between an open position, as shown in FIG. 10, in which the toggle sits fully within the hole 134, and a closed position, as shown in FIGS. 11 to 13, in which part of the toggle still sits within the hole 134, but in which a second end or nose 138 of the toggle extends out of the hole 134 to partially close the opening 131 of the jaw 124.

That toggle is mounted off-centre relative to the bolt 136, whereby it is balanced so that in a normal orientation of the coupler 110, i.e. in an an in-use orientation in which the front and rear jaws 124, 126 (and therefore also any attachment pins held therein) are generally level to each other, the toggle's centre of gravity will cause it to rotate under the influence of gravity into that latter closed position in which the nose 138 descends into the front jaw so as to partially close the opening 131 of the front jaw 124.

By having this arrangement, in normal use an attachment pin 140 within that front jaw 124 will only be able to be removed from the front jaw 124 through the opening 131 of the jaw 124 if the toggle was to rotate out of its way. That is because attachment pins 140 have a size corresponding generally to the height of the front jaw 124. However, further rotation of that toggle is not possible due to the configuration of the toggle, the bolt 136 and the hole 134. The toggle in its closed position has a wall 148 that bears against a front wall member 142 of the hole 134 (see FIG. 13). Further, preferably that front wall member 142, the bolt 136 and the toggle are all reinforced, toughened or hardened as well, whereby they should be able to resist even a significant attempt to force an attachment pin 140 out of the jaw.

Referring now to FIG. 13, specific details of the preferred arrangement for the toggle, the hole 134, the bolt 136 and the front wall member 142 will now be described.

The toggle preferably comprises at its first end two perpendicular walls 144, 148 that tangentially extend from a curved section 146. There is also a third wall 149 that extends parallel to and perpendicular to the two other walls 144, 148, respectively. Further, that first end has an aperture therein through which the bolt 136 passes for pivotally mounting the toggle within the hole 134 of the front jaw 124. The aperture is between the two parallel walls 148, 149 and runs parallel to all three walls 144, 148, 149.

The hole 134 in the upper wall 132 of the front jaw 124 has a flat bottom 151 and the inside surface of the front wall member 142 extends perpendicular to that flat bottom 151. That inside surface also is flat.

The bolt 136 is arranged through the hole 134 of the first jaw 124 in a position that is spaced from, yet parallel to, both the flat bottom 151 and the inside surface of the front wall member 142. The distance of the bolt 136 from the inside surface is slightly greater than the radius of the curved section 146 of the toggle. The distance of the bolt 136 from the flat bottom is greater than its distance from the inside surface.

The aperture in the toggle is arranged concentrically to the curved section 146 of the toggle. As a result, the toggle will be free to rotate within the hole 134 through a full 90° range of angles, i.e. between its open and closed positions. In the open position, the first of the two perpendicular walls 144, 148 will bear against the front wall 142 to provide a first rotation limitation for the toggle. In the closed position, the second of the two perpendicular walls 144, 148 will bear against the front wall 142 to provide a second rotation limitation for the toggle. Changing the angle between these two perpendicular walls 144, 148 will therefore change the available range of angles of rotation for the toggle.

In addition, the toggle comprises a second end 138—the end that extends out of the hole 134 when the gravity-operated member 130 is in its closed position. That end 138 comprises a curved wall 150 that will face towards an attachment pin 140 within the front jaw 124 when the member 130 is in its closed position. That curved surface, although optional, provides an increased area of surface contact between the attachment pin 140 and the toggle in the event of an attempt to remove the attachment pin 140 from the front jaw 124 through the opening of the jaw 124 when the member 130 is in its closed position. As a result, forces are less concentrated on the toggle.

No biasing member is provided for the toggle, whereby it relies purely upon gravity for its orientation. However, as a result it is free to rotate within that 90° range if it is acted upon by an external force. Accordingly, although the toggle will prevent the withdrawal of an attachment pin 140 from the front jaw 124, the toggle will rotate to allow an attachment pin 140 to be inserted into the jaw 124 (as shown in FIG. 10).

By positioning the aperture for the bolt 136 in the first end of the toggle, the centre of gravity of the toggle is arranged towards the second end of the toggle relative to its pivot axis. Thus the gravity-operated member 130, which is mounted in the upper wall 132 of the front jaw 124 (which upper wall 132 extends generally parallel to the longitudinal axis of the coupler 110) will default to a closed position whenever the coupler is level (e.g. as shown in FIG. 11). However, the toggle can be opened by rotating the coupler clockwise (as seen in the drawings) through an angle of about 90°, i.e. into the crowd position.

Figure 14:
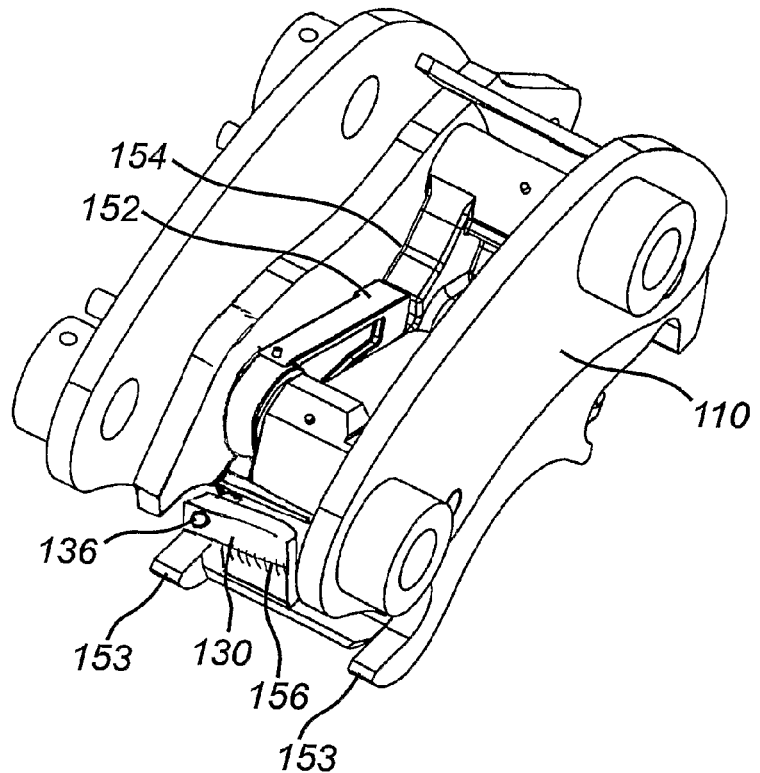
FIG. 14 is a front perspective view of a further embodiment of the present invention.
Figure 15:
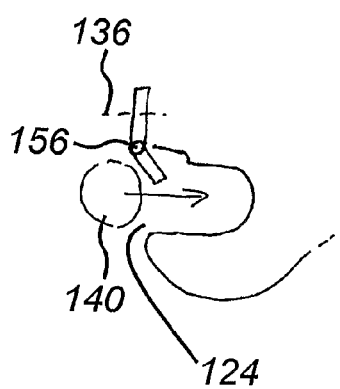
FIG. 15 is a schematic view of the embodiment of FIG. 14 showing an attachment pin of an accessory passing the member.
Figure 16:
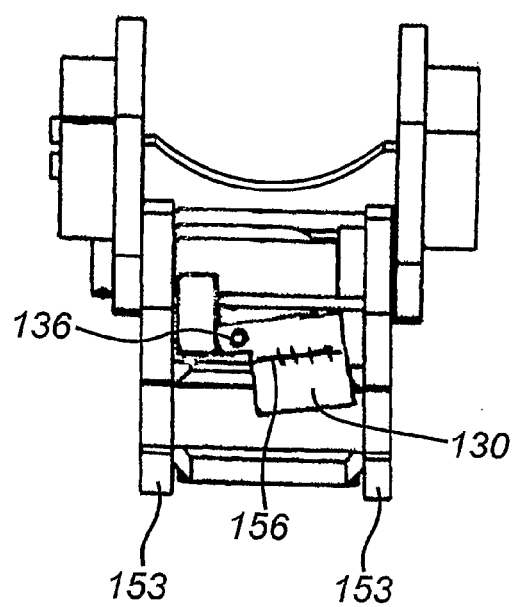
FIG. 16 is a front elevation view of the embodiment of FIG. 14 with the member in its jaw-closed position.

Referring now to FIGS. 14, 15 and 16, an alternative embodiment of the present invention is disclosed in which an alternative gravity-operated member 130 is provided.

Instead of the coupler having a primary coupling mechanism in accordance with GB2359062, the coupler of this embodiment features a primary coupling mechanism involving a latching hook 154 and a blocking bar 152 for that latching hook 154, similar to that disclosed in GB2330570, the disclosures of which are incorporated herein by way of reference. Yet further, the front jaw is formed from two sideplates 153, rather than having the moulded, pointed, configuration of the first embodiment. Both configurations, however, are generally conventional and interchangeable.

In accordance with this alternative embodiment, the gravity-operated member 130 features a flap member that has a first pivot axis 136 that extends in a generally longitudinal direction of the coupler 110. Therefore, to allow it to rotate out of the opening of the jaw 124 from its locked position (as shown in FIG. 14), the coupler 110 needs to be inverted to a greater degree than the first embodiment—it must be almost completely inverted in order for gravity to cause it to rotate about its pivot axis into its open position. Additionally, however, the flap member has a second pivot axis 156—a hinge axis. That second pivot axis 156 can be free swinging between a straight and folded position or it may be spring biased to keep it closed even when the coupler is inverted. The hinge, however, will have a rotation stop (not shown) as known in the art of hinges, to prevent it from swinging in the opposite direction to that shown in FIG. 15, whereby an attachment pin can be inserted into the jaw, but by means of which the attachment pin cannot be removed from the jaw without inverting the coupler. Thus the hinged flap can also provide a similar function to the toggle of the first embodiment.

Referring now to FIGS. 17 to 32, another embodiment of the present invention is shown. In many ways this is similar to the embodiment disclosed in FIGS. 1 to 9. Thus similar or corresponding features of this embodiment to that earlier embodiment have been given the same reference signs.

This further coupler design also has a pivoting latching hook 26 that is adapted for rotation about a pivot 28 for locking an attachment pin 54 in a rear jaw 22 of the coupler 10. That pivoting latching hook 26 is also power operated under the control of a hydraulic ram 32.

The hydraulic ram 32 is attached at the free end of its piston to the latching hook 26 at a first pivot axis 29. The free end of the cylinder of that hydraulic ram 32 is attached to the frame 38 of the coupler 10 at a second pivot axis. That second pivot axis is centred on the bearing hole 40 of the mechanical stop 36. Thus a single axle 41 can be provided for both the cylinder of the hydraulic ram 32 and the mechanical stop 36.

As shown in FIG. 17, that axle 41 extends through both sidewalls of the frame 38 of the coupler 10.

The pivoting latching hook 26 has also again got an attachment pin facing surface 64 which engages against a rear attachment pin 54 when an accessory is coupled to the coupler 10.

The pivoting latching hook 26 also again has a back surface 66 against which an end 56 of the mechanical stop 36 bears when it is in a latching position behind (or "in front of" when referring to its relative position in relation to the coupler as a whole) that hook 26. That is clearly shown in FIG. 18.

The back surface 66 of the pivoting latching hook 26 also again features a flange 68 that also serves to support the mechanical stop 36 for preventing the mechanical stop 36 from swinging into a front-jaw opening position while an attachment pin is retained within the rear jaw 22 by the latching hook 26.

As for the second latch 34, however, although it is similarly positioned for at least partially closing the mouth of the front jaw 24, its interaction with the mechanical stop 36 is different—in this embodiment, the second latch 34 is not connected to the mechanical stop 36, although the two elements can selectively engage each other under certain conditions. Instead it is mounted for pivotal movement about its own separate pivot axle 243, much like the gravity operated member of FIGS. 10 to 16.

The interaction between the pivoting latching hook 26, the mechanical stop 36 and the second latch 34 will be further described below.

With reference to FIGS. 19 to 23, a preferred method of coupling an accessory to the coupler 10 will now be described.

Figure 19:
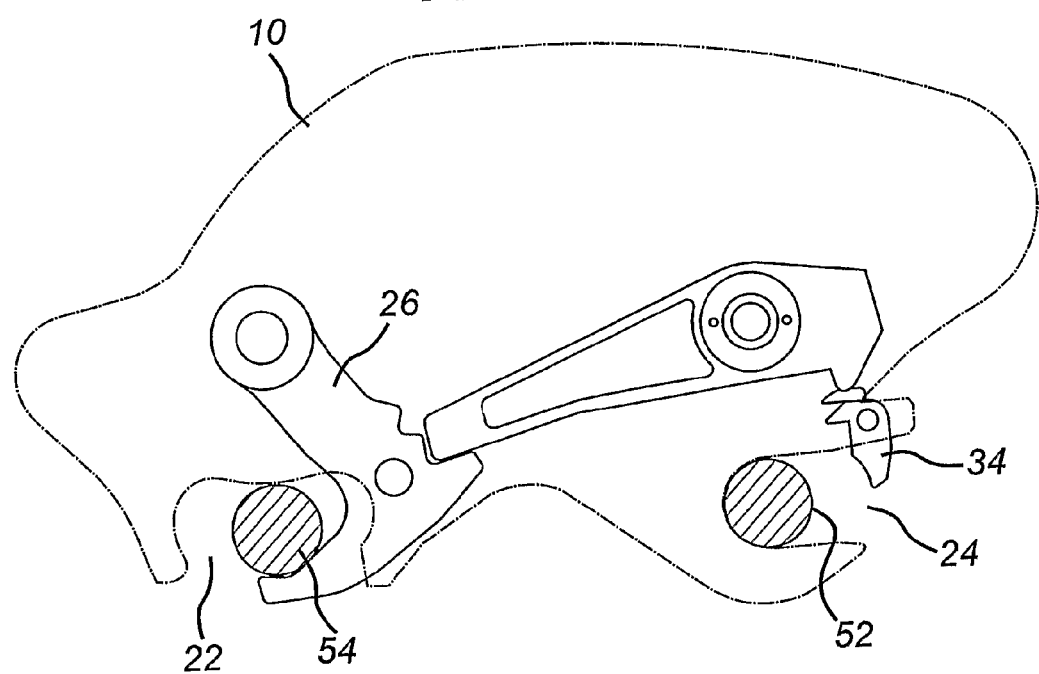
FIG. 19 is a schematic view of the coupler of FIG. 17 with two attachment pins of an accessory secured thereto.

As can be seen, the aim is to achieve the completed attachment as shown in FIG. 19, i.e. with the two attachment pins 52, 54 of an accessory (not shown) safely secured within the two jaws 22, 24 of the coupler 10—the rear attachment pin 54 is held by the pivoting latching hook 26 in the rear jaw 22, thus also preventing movement of the front attachment pin 52 within the front jaw 24, but with the front jaw 24 also at least partially closed by the second latch 34 so that the front attachment pin 52 would not be free to exit the front jaw 24 in the event of an incorrect mounting of the rear attachment pin 54 within the rear jaw 22 by the pivoting latching hook 26.

To achieve that completed attachment, the first step, with an uncoupled coupler 10, is to power the hydraulic ram 32 to a fully extended state, for fully extending the pivoting latching hook 26 rearwardly across the rear jaw for closing that rear jaw. See FIG. 20. By powering that latching hook 26 rearward, the flange 68 extending from the back surface 66 of the latching hook 26 clears away from of the end 56 of the mechanical stop 36. Then, with the coupler in a normal, non-inverted orientation, i.e. preferably with the two jaws at approximately the same height with respect to each other, the mechanical stop 36 will fall past that flange into a fully rotated position—the third or predetermined non-latching position, whereat further rotation is prevented by a stop 245 provided on the frame or main body 38 of the coupler 10. This stop 245 is illustrated schematically in FIG. 20 and is likely to be some integral component of the base of the frame 38 of the coupler 10.

With the mechanical stop 36 in that predetermined non-latching position, the opposite end 247 of it—extending away from the pivot axle 41 in a different direction—will have lifted to move a flange 249 of it clear of a corresponding flange 251 on the second latch 34. The second latch is therefore then free to rotate between a closed or locked condition into a non-closed position.

The interrelation between those flanges, and the rotation of the second latch 34 between a closed or locked condition and the non-closed position will be described in greater detail below.

Figure 20:
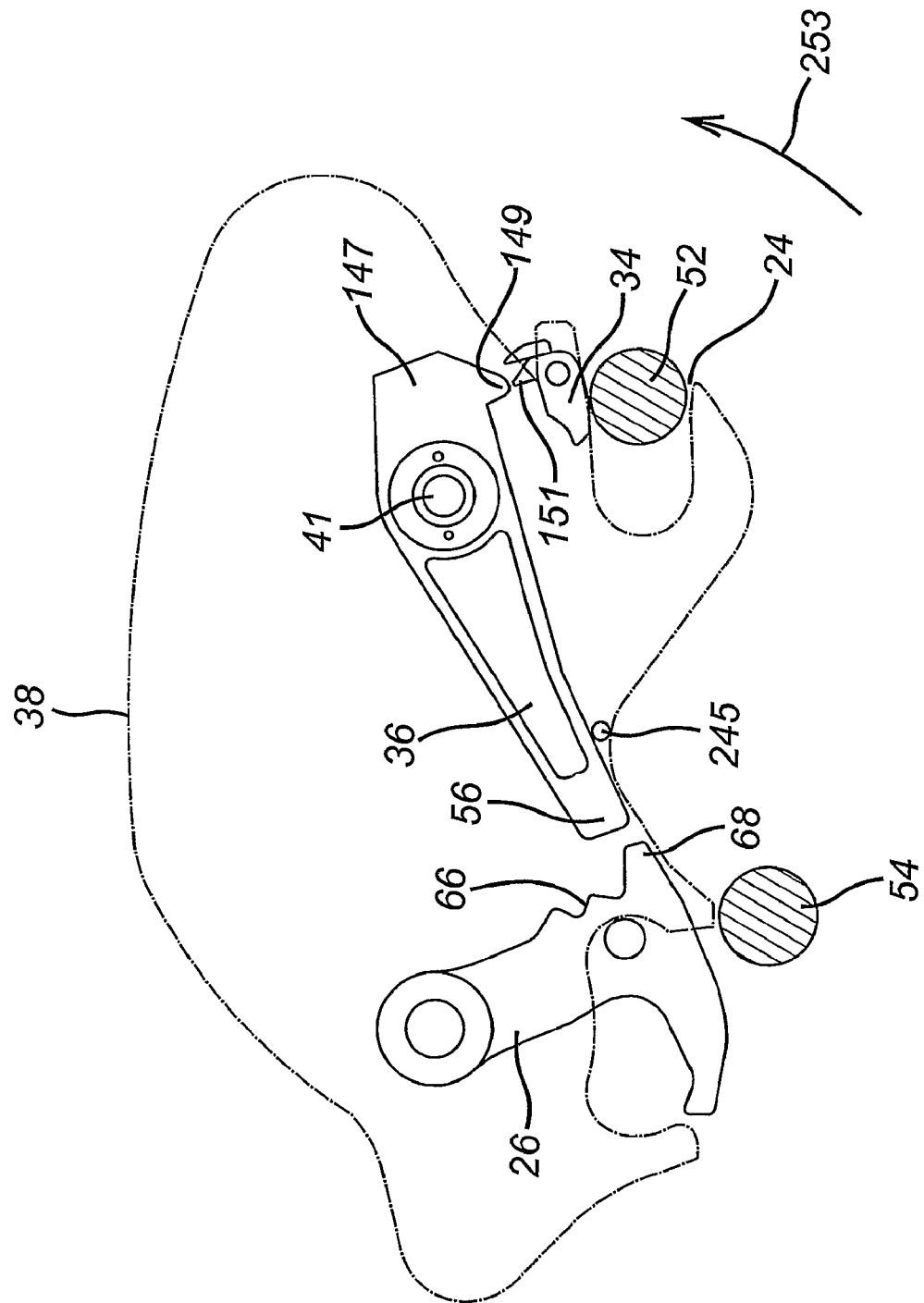

Since the second latch 34 is now free to rotate through its full range of motion within the frame 38 of the coupler 10, a front attachment pin 52 can be slotted through the mouth of the front jaw 24 as shown in FIG. 20. During that process, the front attachment pin 52 will rotate the second latch 34 up into the roof of the jaw 24 so that it can pass that second latch 34 for locating into the rear of that jaw 24. The second latch will then fall again under the influence of gravity into a closed position, thereby locking that attachment pin within that jaw 24. That therefore is a first safety feature of the present invention—the accessory cannot now accidentally decouple itself from that front jaw 24.

Figure 21:
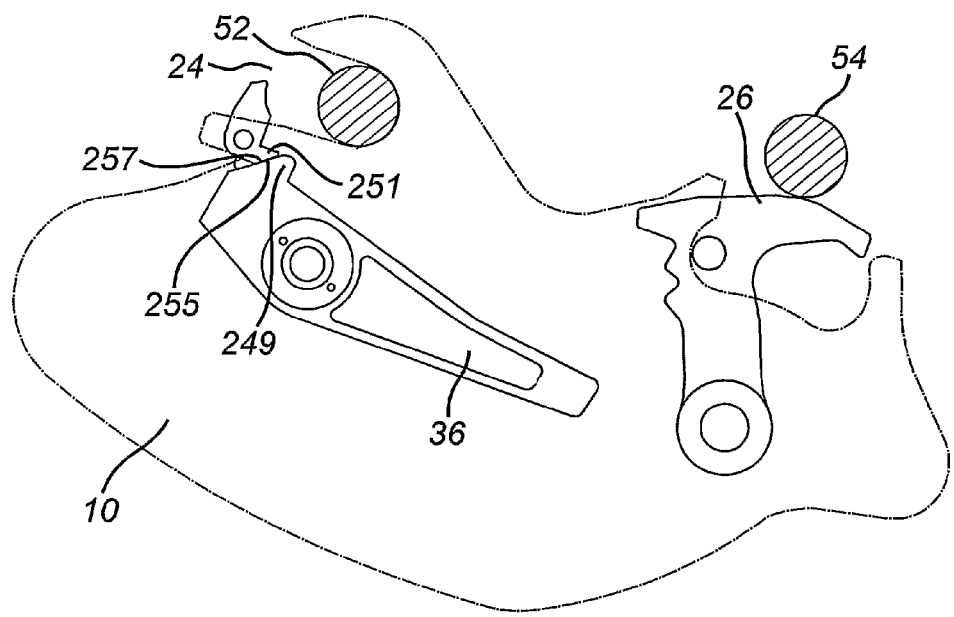

The accessory, however, is only presently half coupled to the coupler 10. Thus it is now necessary to have the rear attachment pin 54 secured into the rear jaw. For that, as shown in FIG. 21, and by the arrow 253 in FIG. 20, the coupler 10 and accessory, with it two attachment pins 52, 54, is rotated by crowding the excavator arm so as to place the accessory generally above the coupler 10.

During that rotation, if the front attachment pin 52 was not already fully engaged into the rear of the front jaw 22, the weight of the accessory will pull the front attachment pin 52 tightly into the rear of the front jaw 22. Further, the weight of the accessory will causes the rear pin 54 of the accessory to bear against the underside (or now top side since the coupler is inverted) of the pivoting latching hook 26. Yet further, due to the inversion of the coupler, and the arrangement of the moment of inertia of the mechanical stop 36, that mechanical stop 36 will also rotate under the influence of gravity (in a counter-rotation direction relative to the rotation of the coupler) so as to fall into a non-latching position away from the back surface 66 of the pivoting latching hook 26.

As the mechanical stop rotates in that manner relative to the coupler, a bearing surface 255 on its flange 249 (at its opposite end of the mechanical stop) then engages a bearing surface 257 on the adjacent flange 251 of the second latch 34 for biasing that second latch 34 into its jaw-closing position, thus again ensuring a secure initial coupling of the first attachment pin 52 to the coupler 10. Thus, even though still only one attachment pin is within a jaw of the coupler 10 (the front jaw 24), the accessory would still not fall out of the front jaw 22 even if the coupler was to be further rotated, despite it being inverted, due to the second latch now being biased into its closed position.

Figure 22:
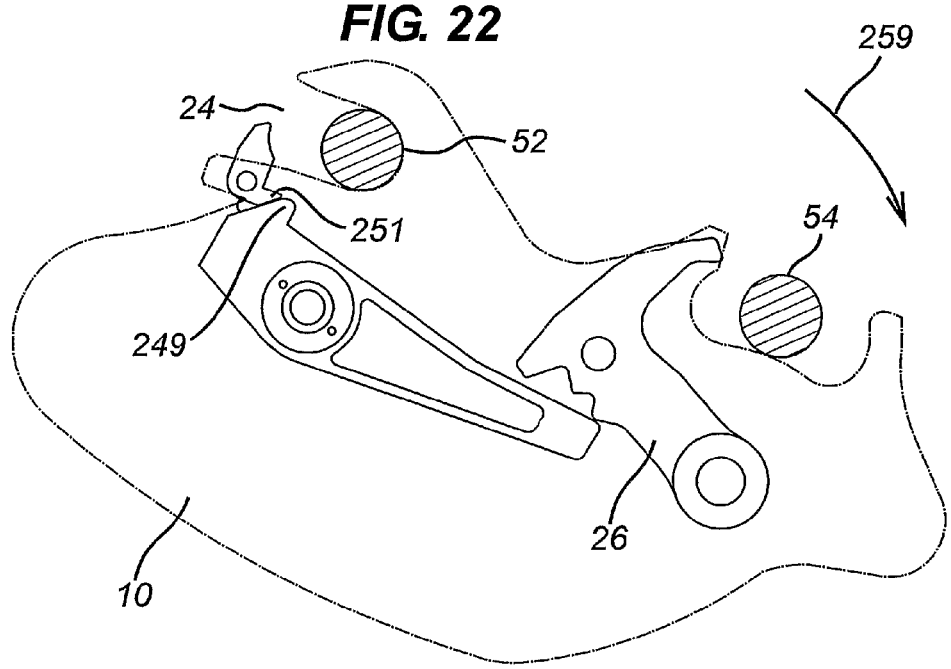

Whilst in that inverted condition, the next step is to power the hydraulic ram to draw back the pivoting latching hook 26 into a retracted, jaw-open position, as shown in FIG. 22. This has to be done while the coupler 10 is inverted in order not to have the mechanical stop 36 blocking its path.

As a result of the retraction of the pivoting latching hook 26, the rear attachment pin 54 will fall into the rear jaw 22 under the weight of the accessory.

Once the rear attachment pin is located in that rear jaw 22, the hydraulic ram 32 is again powered to extend the pivoting latching hook 26 back across the rear jaw 22 for securing the pin 54 within the rear jaw 22.

The coupler 10 can then be rotated back to a non inverted condition by uncrowding the excavator arm, as shown by arrow 259 in FIG. 22.

Figure 23:
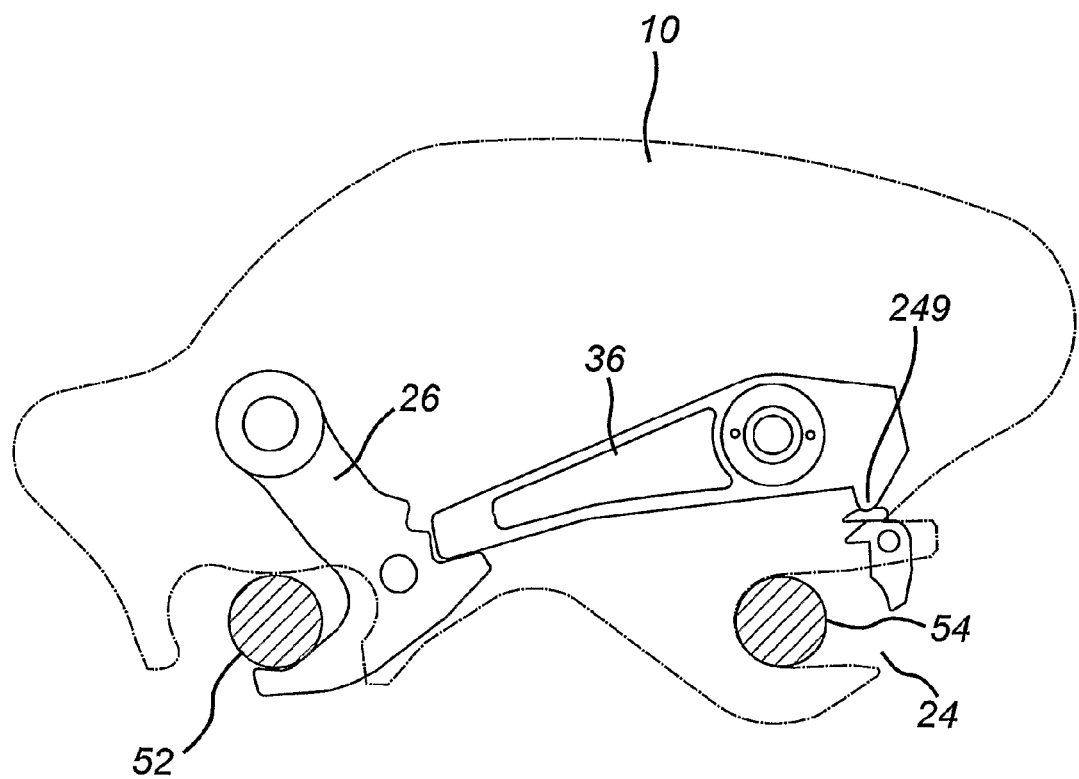

Once normally oriented, the mechanical stop 36 falls back into a latching position on the flange 68 (or on one of the stepped surfaces provided on the back surface of the hook 26 if a narrower pin spacing is provided for the accessory), as shown in FIG. 23. The accessory is thus now correctly coupled to the coupler 10.

Referring next to FIGS. 24 and 25, further details of the second latch, and its interaction with the mechanical stop 36, will be described.

As shown in FIG. 24, the coupler 10, with an attached accessory, has been rotated to an angle of approximately 45° relative to the level orientation. The mechanical stop 36 is still in its blocking position behind the latching hook 26. Further, the two attachment pins 52, 54 are securely locked within the jaws 22, 24 of the coupler 10. Yet further, due to the orientation of the coupler, the second latch 34 has rotated under its own weight into a non fully closed position.

Referring then to FIG. 25, which is an enlarged view of the second latch 34 and the mechanical stop 36, while the coupler 10 is still rotated to an angle of approximately 45° relative to the level orientation, it can be seen that the second latch 34 has a pivot axle 243, about which it rotated into the illustrated non fully closed position. Further it has a first flange 261 extending in a first direction away from that axle 243. That flange 261 serves to at least partially close the front jaw 24 when the second latch 34 is in a closed position (such as this non fully closed position, or the fully closed position of FIG. 23). Yet further the second latch 34 has a second flange 251. That flange 251 is the flange mentioned above that has the bearing surface 257 that engages with the bearing surface 255 of the mechanical stop when the coupler 10 has been inverted into a crowd position. There is also a third flange 285 which will be described in greater detail below with reference to FIGS. 31 to 33.

It should be appreciated that the mechanical stop 36 is in a blocking position. Thus its end 56 bears down on the flange 68 of the pivoting latching hook 26 (not shown in FIG. 25—see instead FIG. 24). As a result, rotation of the mechanical stop 36 in a further anti-clockwise direction (as viewed in FIG. 25) is not possible. As a result of that, the mechanical stop, in this blocking position serves two purposes. Firstly it serves to prevent retraction of the pivoting latching hook 26 from its latched position, as per the prior art. Secondly, however, it serves to prevent rotation of the second latch into a non jaw closing position in the roof of the front jaw 24. That is achieved s follows:

The bearing surface 257 on the second flange 251 of the second latch 34 bears against the point 263 of the flange 249 on the mechanical stop 36 prior to the second latch 34 achieving a position in which the front attachment pin 52 can exit the front jaw 24. Attempts to further rotate the second latch will also be in vain due to the inability for the mechanical stop to rotate further anti-clockwise due to it already bearing against the flange 68 of the pivoting latching hook (as discussed above). Thus this arrangement provides a highly secure coupling of an accessory onto the coupler in that neither jaw can be opened while the coupler is in a normal orientation.

It should also be appreciated that with narrower pin spacings, the mechanical stop would be rotated even less anti-clockwise due to it sitting on one of the stepped surfaces on the back surface 66 of the hook 26. Thus the degree of available rotation for the second latch 34 from a fully closed condition would be even more restricted.

In view of the above arrangement, a special procedure needs to be followed for decoupling an accessory from the coupler 10 of this embodiment. This procedure will now be described with reference to FIGS. 26 to 30.

Figure 26:
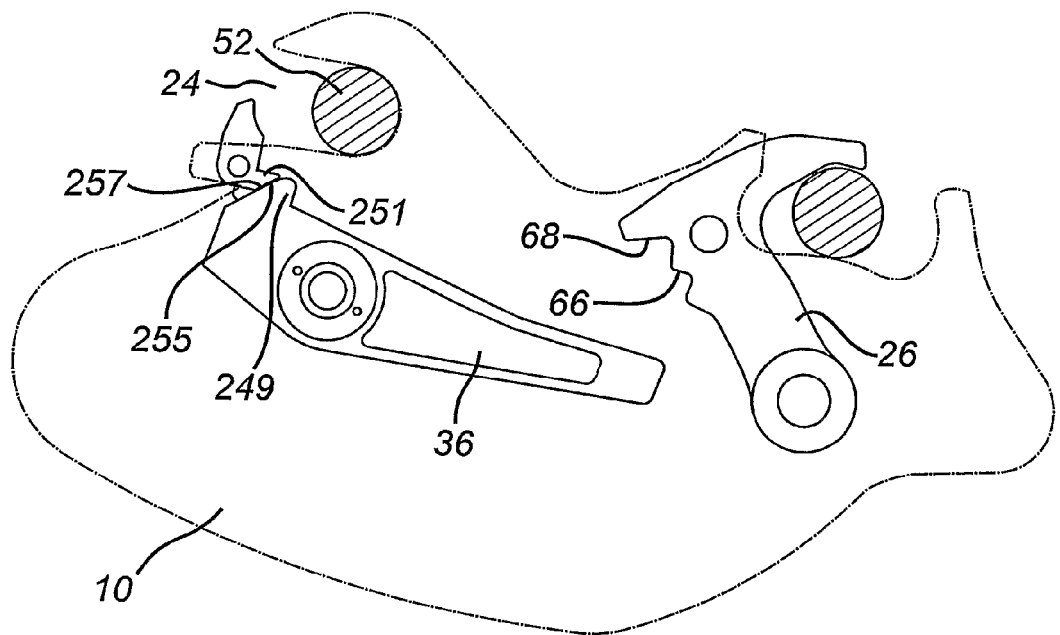

The first action to taken is to rotate the coupler, and the accessory, into the crowd position, as shown in FIG. 26 for inverting the coupler. The mechanical stop 36 will then falls away from behind the back surface 66 of the hook 26 (and the second latch 34 will also be biased into the fully closed position as discussed above). This position is shown in FIG. 26.

Figure 27:
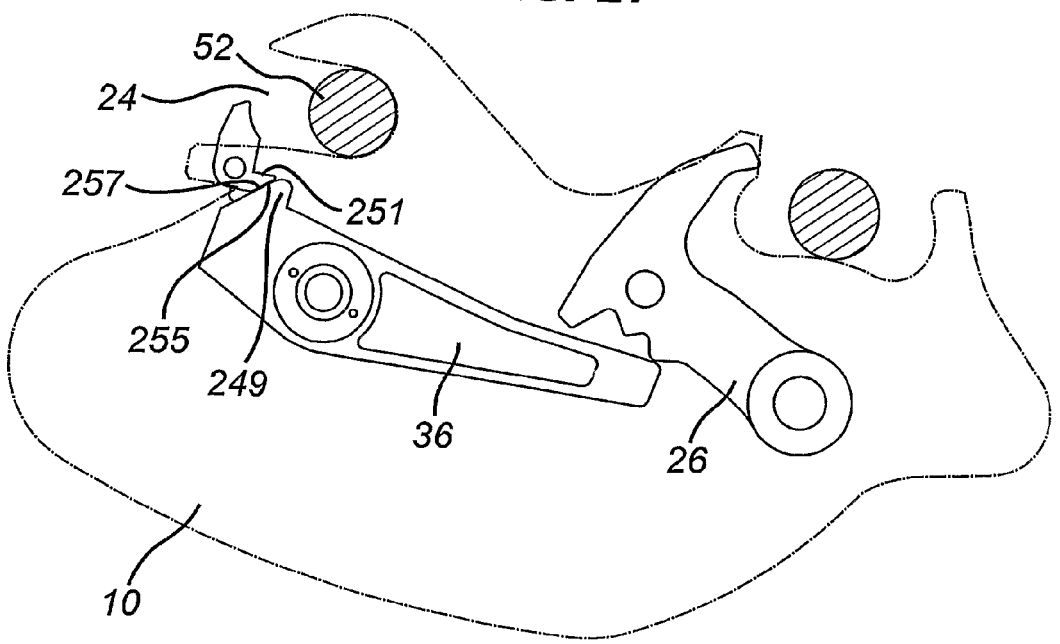

Once in that position, the rear jaw 22 can then be opened by powering the pivoting latching hook 26 into a retracted position as shown in FIG. 27. That then unlocks the rear attachment pin 54 from its containment within the rear jaw 22.

To then remove the rear attachment pin 54 from the now open rear jaw 22, the coupler 10 and accessory are once again rotated from the crowd position and the accessory is then rested on the floor so as to allow the coupler 10 and the accessory to be rotate relative to one another about the front attachment pin 52 within the front jaw 24 as the excavator arm is further operated.

Figure 28:
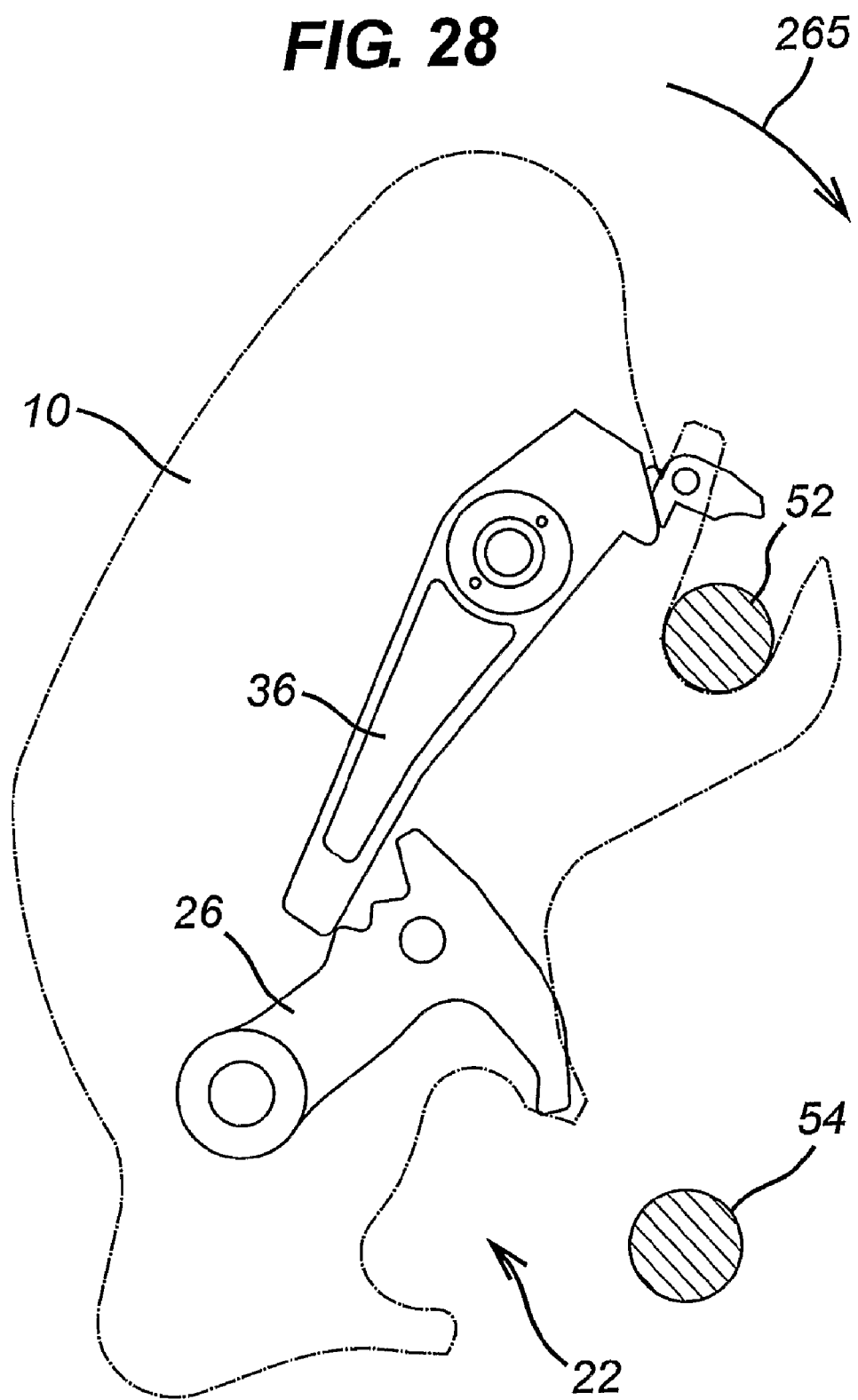

That relative rotation (see the arrow 265 in FIG. 28) then draws the rear attachment pin 54 clear of the rear jaw 22, as shown in FIG. 28.

Figure 29:
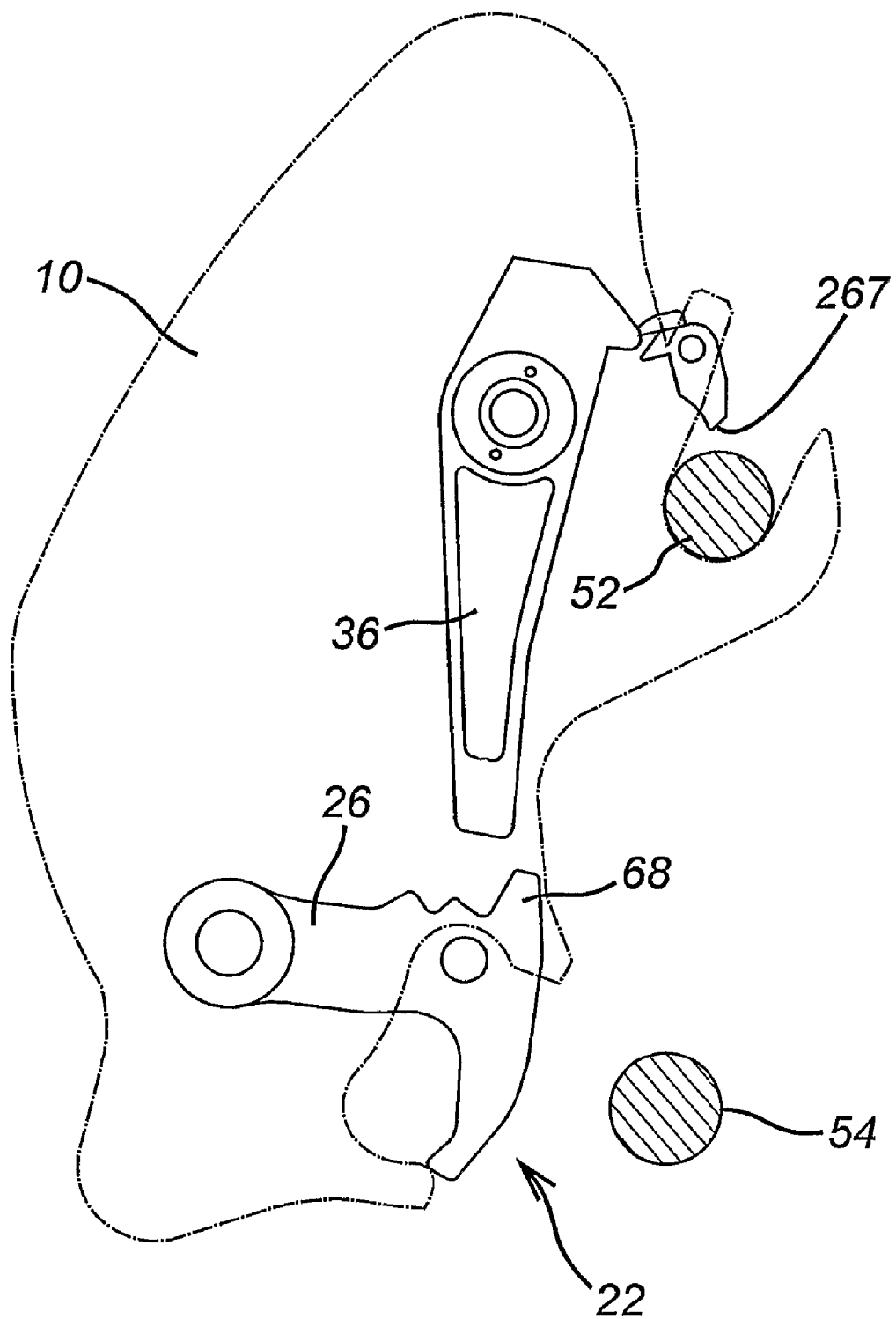
Figure 30:
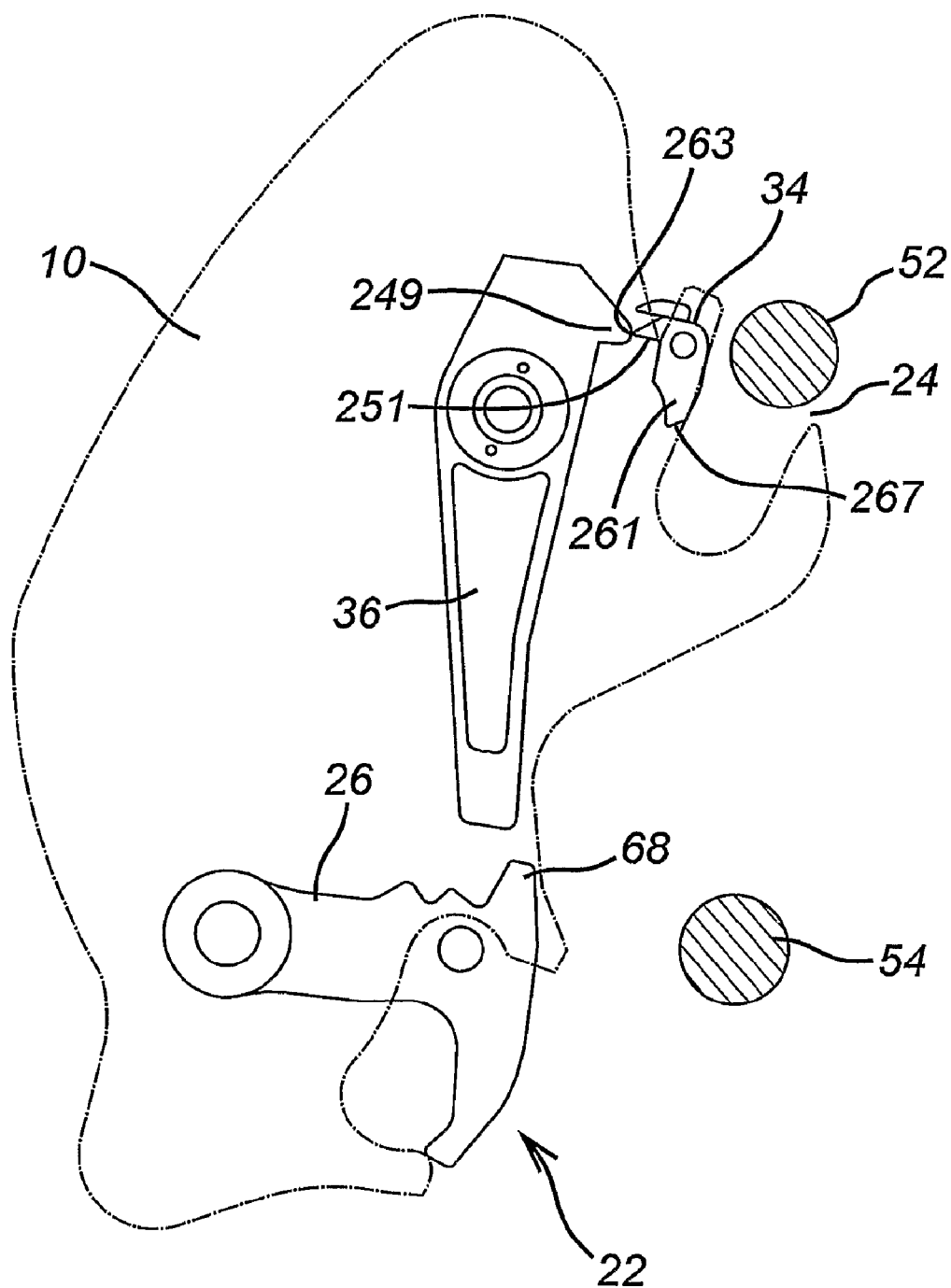

Once the rear attachment pin 54 is clear of the rear jaw 22, and while the accessory is resting on the floor (in the case of a bucket, in a tipped condition), the pivoting latching hook 26 can then again be powered into a fully extended condition across the mouth of the rear jaw 22, as shown in FIG. 29, for moving the flange 68 clear of the mechanical stop. The mechanical stop is then free to assume the third or predetermined position for releasing the second latch 34—in that third or predetermined position, the point 263 of the flange 249 of the mechanical stop 36 is displaced sufficiently far away from the flange 251 of the second latch 34 that they won't engage one another. Thus the coupler can then be further manipulated by the excavator arm to orient the coupler nearly on end so as to fully open the front jaw 24—see FIG. 30. The accessory can then be released from the coupler 10 by lowering the coupler with respect to the front attachment pin of the accessory. The accessory will then fall to its rest position on the ground, decoupled from the coupler 10.

To facilitate that final decoupling, the first flange 261 of the second latch 34 has a ramped nib 267 on its end, whereby even if the first flange 261 of the second latch 34 is not fully oriented into the roof of the front jaw 24 by the rotation of the coupler 10, the passing of the attachment pin 52 out of the front jaw 24 against the nib 267 will push the second latch into that fully open position.

A beneficial result of this decoupling procedure can also be seen in that the coupler 10 is immediately ready for coupling to another accessory—the pivoting latching hook is already in its fully extended condition.

Referring finally to FIGS. 31 to 33, further details of the second latch 34 and its interaction with the frame 38 of the coupler 10 will be described in further detail.

As previously described, the second latch 34 is mounted onto the frame via a pivot axle 243. For that purpose, the frame 38 has two coaxial through-holes 269 in side walls 275 of a rail 277. Further, those holes can be aligned with a through-hole 271 in the second latch 34, and the axle 243 is then threaded through those three holes. The holes are shown in FIGS. 32 and 33.

Once the axle 243 has been threaded through those through-holes 269, 271, one or more cotter pin 273, or the like, is used to retain that pivot axle 243 within the frame 38 and the second latch 38.

The second latch 34 is thus pivotally mounted to the frame 38 via a rail 277 that is integrally formed on the front 16 of the frame 38 of the coupler 10.

The rail 277 has an inside surface that is adapted to be born against by the front of the first flange 261 of the second latch 34. Preferably that front is a front-most surface 279 on the leading face of the first flange 261 when the second latch is in a fully closed condition.

The front 279 is preferably planar but may instead be curved. Preferably the inside surface 281 of the rail 277 has a corresponding shape to provide a large surface area of contact between the second latch 34 and that rail 277 when the second latch is in its fully forward or fully closed position.

As also shown in FIG. 33 (in which the second latch 34 and the pivot axle 243 have been removed for clarity), a further load bearing surface 283 is formed on the frame 38 of the coupler 10. This additional load bearing surface 283 is spaced from the inside surface 281 of the rail 277 but is again integrally formed with the frame 38.

It should be noted that the rail and the load bearing surface may be welded to, or otherwise connected to, the frame 38.

The additional load bearing surface 283 is also for bearing any load carried by the frame when the second latch 34 is in a fully closed condition, further to spread the load. For that purpose, the third flange 285 (mentioned above) is provided on the second latch 34.

That third flange is clearly shown in FIG. 32, in which the frame has instead been removed for clarity.

That third flange 285 has a bearing surface 287 on its underside. It is positioned so that it bears against the additional load bearing surface 283 whenever the front of the second latch is bearing against the inside surface of the rail. It this provides the additional surface area against which the second latch can bear when it is in its fully closed position.

The additional area is particularly beneficial since it spreads the loading on the frame in the event of the second latch being tasked to carry the weight of an accessory on it, such as due to a failure of some other component of the coupler (such failure releasing the attachment pin in the rear jaw 22), or in the event of an improper mounting state for the accessory. Simply loading such a potential force onto the rail might overload the rail.

Preferably the two bearing surfaces 287 (on the first and third flanges 285 of the second latch 34 are planar and substantially perpendicular to one another.

In this embodiment it is also shown that the third flange 285 extends only part way across the width of the second latch (i.e. in the axle direction). It stops clear of the arm of the mechanical stop. Further, where it ends, the second flange 251 starts. In this manner, the mechanical stop will not interfere with the operation of the third flange.

The third flange is in a different plane to the second flange of the second latch 34.

It is also observed that the front of the second latch 34 has two additional surfaces—the ramped nib 267 described above and an intermediate ramp 289. Those two additional surfaces may be blended to form a curve, which curve may be blended with the front planar surface 279. Those surfaces allow or assist the above described camming of the second latch 34 into the roof of the jaw 24 as the front attachment pin 52 exits the jaw 24 during the last stage of the decoupling procedure.

Various aspects of the present invention have been described above purely by way of example. It should be noted, however, that modifications in detail can been made within the scope of the invention as defined in the claims appended hereto, and elements of one aspect might be combined with elements of the other aspects, as would be appreciated by a skilled person.

The invention claimed is:

1. A coupler for attaching an accessory to an excavator arm of an excavator, the accessory having a first attachment pin and a second attachment pin, the coupler comprising:
   a frame having two pivot pins, a rear jaw that is downwardly facing and a front jaw with an opening that is forward facing and rotated approximately 90 degrees relative to the rear jaw, the rear jaw being adapted to accommodate a range of accessory pin spacings for accommodating different accessories;
   a mechanical actuator positioned within the frame, the mechanical actuator being a hydraulic ram;
   a first latch having a first attachment pin engaging surface and being rotatable relative to the frame about a first of the two pivot pins in response to actuation of the mechanical actuator;
   a second latch having a second attachment pin engaging surface;
   a third element being pivotally mounted relative to the frame about a second of the pivot pins, the third element being a mechanical stop and being mechanically linked to the second latch such that rotation of the third element about the second pivot pin mechanically actuates the second latch; and
   the first latch being pivotally connected to the hydraulic ram by a third pivot pin;
   wherein actuation of the hydraulic ram rotates the first latch about the first pivot pin selectively to engage or disengage the first attachment pin engaging surface against the second attachment pin of the accessory when or if the second attachment pin is received in the rear jaw, and causing the third element to rotate about the second pivot pin can cause the second attachment pin engaging surface selectively to latch or unlatch the first attachment pin of the accessory in the front jaw when or if the first attachment pin is received in the front jaw;
   the second latch, when in a position to latch the first attachment pin in the front jaw, downwardly extending at least partially across the opening of the front jaw such that the second latch will be visible from within a cab of the excavator when the coupler is attached to the excavator arm of the excavator.

2. The coupler of claim 1, wherein the second latch has a hinge and the third element is mechanically linked to the latch via the hinge.

3. The coupler of claim 1, wherein the third element is a blocking bar adapted selectively to resist movement of the first latch from a latching position into a non-latching position.

4. The coupler of claim 1, wherein the rear jaw is significantly wider in side view than the front jaw.

5. The coupler of claim 1, wherein the mechanical actuator is a hydraulic ram that is mounted to the frame between and above the rear jaw and the front jaw.

6. The coupler of claim 1, wherein the second latch is arranged to pivot about a pivot axis relative to the third element.

7. The coupler of claim 1, wherein the second attachment pin engaging surface is generally flat.

8. The coupler of claim 1, wherein the first latch is a pivoting latching hook that is movable between a latching position and a non-latching position by the mechanical actuator.

9. The coupler of claim 1, wherein the mechanical actuator is a hydraulic ram that includes a check valve to prevent release of hydraulic pressure on the ram in the event of a hydraulic failure.

10. The coupler of claim 3, wherein the first latch has the said first attachment pin engaging surface that defines a latching face facing in a first direction for bearing against the first attachment pin, and the first latch also has a second face, facing away from that latching face, wherein one or more flange is formed on that second face.

11. The coupler of claim 1, wherein the mechanical stop has an arm with an end extending from a bearing hole, that end being for bearing against a flange so as to assume a latching position, the flange having at least one step onto which the mechanical stop's end can sit when the mechanical stop is in the latching position.

12. An excavator, comprising:
   a powered excavator arm;
   a cab;
   a coupler for attaching an accessory to an excavator arm of an excavator, the accessory having a first attachment pin and a second attachment pin, the coupler comprising:
      a frame having two pivot pins, a rear jaw that is downwardly facing and a front jaw with an opening that is forward facing and rotated approximately 90 degrees relative to the rear jaw, the rear jaw being adapted to accommodate a range of accessory pin spacings for accommodating different accessories;
      a hydraulic ram positioned within the frame;
      a first latch having a first attachment pin engaging surface and being rotatable relative to the frame about a first of the two pivot pins in response to actuation of the hydraulic ram;
      a second latch having a second attachment pin engaging surface;
      a third element being pivotally mounted relative to the frame about a second of the pivot pins, the third element being a mechanical stop and being mechanically linked to the second latch such that rotation of the third element about the second pivot pin mechanically actuates the second latch; and
      the first latch being pivotally connected to the hydraulic ram by a third pivot pin;
      wherein actuation of the hydraulic ram rotates the first latch about the first pivot pin selectively to engage or disengage the first attachment pin engaging surface against the second attachment pin of the accessory when or if the second attachment pin is received in the rear jaw, and causing the third element to rotate about the third pivot pin causes the second attachment pin engaging surface selectively to latch or unlatch the first attachment pin of the accessory in the front jaw when or if the first attachment pin is received in the front jaw;

the second latch, when in a position to latch the first attachment pin in the front jaw, downwardly extending at least partially across the opening of the front jaw such that the second latch is visible from within the cab.

13. The excavator of claim 12, wherein the rear jaw is significantly wider in side view than the front jaw.

14. The excavator of claim 12, wherein the hydraulic ram is mounted to the frame between and above the rear jaw and the front jaw, relative to a top and bottom of the coupler.

15. The excavator of claim 12, wherein the second latch is arranged to pivot about a pivot axis relative to the third element.

16. The excavator of claim 12, wherein the second attachment pin engaging surface is generally flat.

17. The excavator of claim 12, wherein the first latch is a pivoting latching hook that is movable between a latching position and a non-latching position by the hydraulic ram.

18. The excavator of claim 12, wherein the hydraulic ram includes a check valve to prevent release of hydraulic pressure on the ram in the event of a hydraulic failure.

19. A coupler for attaching an accessory to an excavator arm of an excavator, the accessory having a first attachment pin and a second attachment pin, the coupler comprising:

a frame having two pivot pins, an upper portion adapted to connect the coupler to the excavator arm and a lower portion having a rear jaw that is downwardly facing and a front jaw with an opening that is forward facing and rotated approximately 90 degrees relative to the rear jaw, the rear jaw having an opening adapted to accommodate a range of accessory pin spacings for accommodating different accessories, the opening of the rear jaw being wider than the opening of the front jaw;

a mechanical actuator positioned within the frame;
a first latch having a first attachment pin engaging surface and being rotatable relative to the frame about a first of the two pivot pins in response to actuation of the mechanical actuator;
a second latch having a second attachment pin engaging surface;
a third element being pivotally mounted relative to the frame about a second of the pivot pins, the third element being a mechanical stop and being pivotally linked to the second latch such that pivoting of the third element about the second pivot pin causes the second latch to move between a latching position and a non-latching position; and
the first latch being pivotally connected to the mechanical actuator by a third pivot pin;
wherein actuation of the mechanical actuator rotates the first latch about the first pivot pin selectively to engage or disengage the first attachment pin engaging surface against the second attachment pin of the accessory when or if the second attachment pin is received in the rear jaw, and causing the third element to pivot about the second pivot pin relative to the second latch can cause the second attachment pin engaging surface of the second latch selectively to latch or unlatch the first attachment pin of the accessory in the front jaw when the first attachment pin is received in the front jaw;
the second latch downwardly extending at least partially across the opening of the front jaw when it is in the latching position whereby the second latch will be visible from within, a cab of the excavator when the coupler is attached to the excavator arm of the excavator.

20. The coupler of claim 19, wherein the mechanical stop has an arm with an end extending from a bearing hole, that end being for bearing against a flange so as to assume a latching position, the flange having at least one step onto which the mechanical stop's end can sit when the mechanical, stop is in the latching position.

* * * * *

UNITED STATES PATENT AND TRADEMARK OFFICE
CERTIFICATE OF CORRECTION

PATENT NO. : 8,256,148 B2  
APPLICATION NO. : 13/156062  
DATED : September 4, 2012  
INVENTOR(S) : Miller et al.

Page 1 of 1

It is certified that error appears in the above-identified patent and that said Letters Patent is hereby corrected as shown below:

On the title page, item (30), after (GB) ............... delete "06173947.2" and insert --0617394.2--.

Signed and Sealed this  
Nineteenth Day of March, 2013

Teresa Stanek Rea  
*Acting Director of the United States Patent and Trademark Office*